US011159806B2

(12) United States Patent
Ramasubramonian et al.

(10) Patent No.: US 11,159,806 B2
(45) Date of Patent: Oct. 26, 2021

(54) POSITION DEPENDENT INTRA PREDICTION COMBINATION WITH MULTIPLE REFERENCE LINES FOR INTRA PREDICTION

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/434,113

(22) Filed: Jun. 6, 2019

(65) Prior Publication Data

US 2020/0007870 A1 Jan. 2, 2020

Related U.S. Application Data

(60) Provisional application No. 62/691,554, filed on Jun. 28, 2018.

(51) Int. Cl.
*H04N 19/174* (2014.01)
*H04N 19/11* (2014.01)
(Continued)

(52) U.S. Cl.
CPC ........... *H04N 19/174* (2014.11); *H04N 19/11* (2014.11); *H04N 19/176* (2014.11); *H04N 19/61* (2014.11); *H04N 19/70* (2014.11)

(58) Field of Classification Search
None
See application file for complete search history.

(56) References Cited

U.S. PATENT DOCUMENTS 10,419,754 B1 * 9/2019 Zhao .................... H04N 19/176
2017/0347093 A1 * 11/2017 Yu ........................ H04N 19/176
(Continued)

FOREIGN PATENT DOCUMENTS

JP          2001339612 A  * 12/2001
WO    WO-2017222326 A1 * 12/2017  ........... H04N 19/119

OTHER PUBLICATIONS

International Search Report and Written Opinion—PCT/US2019/036130—ISA/EPO—dated Sep. 16, 2019.
(Continued)

*Primary Examiner* — Leron Beck
*Assistant Examiner* — Shanika M Brumfield
(74) *Attorney, Agent, or Firm* — Polsinelli LLP

(57) ABSTRACT

Techniques are described using Position Dependent Intra Prediction Combination (PDPC) and multiple reference lines. For example, a video coder (e.g., an encoder and/or decoder) can predict an initial prediction sample value for a sample of a current block using an intra-prediction mode. The initial prediction sample value can be predicted from a first neighboring block and/or a second neighboring block of the current block. One or more reference sample values can be determined from at least one line of multiple lines of reference samples from the first neighboring block and/or the second neighboring block. At least one of the lines from the multiple lines used for determining the reference sample value(s) is not adjacent to the current block. A final prediction sample value can be determined for the sample of the current block, such as by modifying the initial prediction sample value using the one or more reference sample values.

30 Claims, 10 Drawing Sheets

(51) Int. Cl.
　　　*H04N 19/176*　　(2014.01)
　　　*H04N 19/61*　　　(2014.01)
　　　*H04N 19/70*　　　(2014.01)

(56) References Cited

U.S. PATENT DOCUMENTS

2018/0332284 A1* 11/2018 Liu .................. H04N 19/11
2019/0141318 A1*  5/2019 Li ................... H04N 19/176
2019/0306494 A1* 10/2019 Chang .............. H04N 19/176

OTHER PUBLICATIONS

Kang J., et al., "Description of SDR Video Coding Technology Proposal by ETRI and Sejong University", 10. JVET Meeting; Apr. 10, 2018-Apr. 20, 2018; San Diego; (The Joint Video Exploration Team of ISO/IEC JTC1/SC29/WG11 and ITU-T SG.16); URL: http://phendx.int-evry.fr/jvet/, No. JVET-J0013-V3, Apr. 11, 2018 (Apr. 11, 2018), 42 Pages, XP030151171, p. 8. paragraph 2.1.8.2, figures 2-6.

Li J., et al., "Multiple line-based intra prediction" Joint Video Exploration Team (JVET) of ITU-T SG 16 WP 3 and ISO/IEC JTC 1/SC 29/WG 11, 3rd Meeting: Geneva, CH, May 26-Jun. 1, 2016, May 17, 2016, JVET-C0071, XP030150177, URL: http://phenix.int-evry.fr/jvet/, 6 pp.

Li X., et al., "Description of SDR video coding technology proposal by Tencent", 10. JVET Meeting; Apr. 10, 2018-Apr. 20, 2018; San Diego; (The Joint Video Exploration Team of ISO/IEC JTC1/SC29/WG11 and ITU-T SG.16 ); URL: http://phenix.int-evry.fr/jvet/, No. JVET-J0029, Apr. 3, 2018 (Apr. 3, 2018), XP030151198, 34 Pages, p. 8. paragraph 2.1.10.4.

\* cited by examiner

700

PREDICT AN INITIAL PREDICTION SAMPLE VALUE FOR A SAMPLE OF A CURRENT BLOCK USING AN INTRA-PREDICTION MODE, WHEREIN THE INITIAL PREDICTION SAMPLE VALUE IS PREDICTED FROM AT LEAST ONE OF A FIRST NEIGHBORING BLOCK OR A SECOND NEIGHBORING BLOCK OF THE CURRENT BLOCK
702

DETERMINE ONE OR MORE REFERENCE SAMPLE VALUES FROM AT LEAST ONE LINE OF MULTIPLE LINES OF REFERENCE SAMPLES, THE MULTIPLE LINES OF REFERENCE SAMPLES BEING FROM AT LEAST ONE OF THE FIRST NEIGHBORING BLOCK OR THE SECOND NEIGHBORING BLOCK OF THE CURRENT BLOCK
704

DETERMINE A FINAL PREDICTION SAMPLE VALUE FOR THE SAMPLE OF THE CURRENT BLOCK, WHEREIN DETERMINING THE FINAL PREDICTION SAMPLE VALUE INCLUDES MODIFYING THE INITIAL PREDICTION SAMPLE VALUE USING THE ONE OR MORE REFERENCE SAMPLE VALUES
706

RECONSTRUCT THE SAMPLE OF THE CURRENT BLOCK BASED ON THE FINAL PREDICTION SAMPLE VALUE
708

```
┌─────────────────────────────────────────────────┐
│ PREDICT AN INITIAL PREDICTION SAMPLE VALUE FOR  │
│ A SAMPLE OF A CURRENT BLOCK USING AN            │
│ INTRA-PREDICTION MODE, WHEREIN THE INITIAL      │
│ PREDICTION SAMPLE VALUE IS PREDICTED FROM AT    │
│ LEAST ONE OF A FIRST NEIGHBORING BLOCK OR A     │
│ SECOND NEIGHBORING BLOCK OF THE CURRENT BLOCK   │
│ 802                                             │
└─────────────────────────────────────────────────┘
                        │
                        ▼
┌─────────────────────────────────────────────────┐
│ DETERMINE ONE OR MORE REFERENCE SAMPLE VALUES   │
│ FROM AT LEAST ONE LINE OF MULTIPLE LINES OF     │
│ REFERENCE SAMPLES, THE MULTIPLE LINES OF        │
│ REFERENCE SAMPLES BEING FROM AT LEAST ONE OF    │
│ THE FIRST NEIGHBORING BLOCK OR THE SECOND       │
│ NEIGHBORING BLOCK OF THE CURRENT BLOCK          │
│ 804                                             │
└─────────────────────────────────────────────────┘
                        │
                        ▼
┌─────────────────────────────────────────────────┐
│ DETERMINE A FINAL PREDICTION SAMPLE VALUE FOR   │
│ THE SAMPLE OF THE CURRENT BLOCK, WHEREIN        │
│ DETERMINING THE FINAL PREDICTION SAMPLE VALUE   │
│ INCLUDES MODIFYING THE INITIAL PREDICTION       │
│ SAMPLE VALUE USING THE ONE OR MORE REFERENCE    │
│ SAMPLE VALUES                                   │
│ 806                                             │
└─────────────────────────────────────────────────┘
                        │
                        ▼
┌─────────────────────────────────────────────────┐
│ DETERMINE A RESIDUAL VALUE FOR A RESIDUAL BLOCK │
│ BASED ON THE FINAL PREDICTION SAMPLE VALUE AND  │
│ A VALUE OF THE SAMPLE OF THE CURRENT BLOCK      │
│ 808                                             │
└─────────────────────────────────────────────────┘
                        │
                        ▼
┌─────────────────────────────────────────────────┐
│ SIGNAL INFORMATION INDICATIVE OF THE RESIDUAL   │
│ VALUE                                           │
│ 810                                             │
└─────────────────────────────────────────────────┘
```

FIG. 8

POSITION DEPENDENT INTRA PREDICTION COMBINATION WITH MULTIPLE REFERENCE LINES FOR INTRA PREDICTION

CROSS-REFERENCE TO RELATED APPLICATIONS

This application claims the benefit of U.S. Provisional Application No. 62/691,554, filed Jun. 28, 2018, which is hereby incorporated by reference, in its entirety and for all purposes.

FIELD

This application is related to video encoding and decoding. In some cases, systems, apparatuses, methods, and computer-readable media are described for performing position dependent intra prediction combination (PDPC) with multiple reference lines (MRL) for intra prediction.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), among others. Video coding generally utilizes prediction methods (e.g., inter prediction, intra prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for performing position dependent intra prediction combination (PDPC) with multiple reference lines (MRL) for intra prediction. For example, using intra prediction, a prediction block can be generated for a current block based on neighboring samples (which may already be reconstructed or decoded) to the current block. Most intra prediction methods use samples located in the nearest (or adjacent) neighboring lines of samples above and to the left of the current block (directly above or directly to the left of the current block). In some cases, multiple reference lines (MRL) may be used for generating intra-predicted samples. For instance, MRL uses lines that are not just the nearest line to the current block, but can also use lines that are within a certain neighborhood of the current block (e.g., a second nearest line, third nearest line, or other distance from the current block).

PDPC can be used to modify prediction samples determined using intra prediction. For instance, using PDPC, the prediction samples within the prediction block (generated using intra prediction) are modified and the modified prediction samples are used to encode or decode the current block. Several techniques of using PDPC with multiple reference lines, and signaling and/or decoding associated information, are described herein. In some cases, for encoding, a video encoder can use the modified prediction samples to determine residual values that are signaled to a video decoder. In some cases, for decoding, a video decoder can add the modified prediction samples to the received residual values to reconstruct the current block.

According to at least one example, a method of decoding video data is provided. The method includes predicting an initial prediction sample value for a sample of a current block using an intra-prediction mode. The initial prediction sample value is predicted from at least one of a first neighboring block or a second neighboring block of the current block. The method further includes determining one or more reference sample values from at least one line of multiple lines of reference samples, the multiple lines of reference samples being from at least one of the first neighboring block or the second neighboring block of the current block. The method further includes determining a final prediction sample value for the sample of the current block. Determining the final prediction sample value includes modifying the initial prediction sample value using the one or more reference sample values. The method further includes reconstructing the sample of the current block based on the final prediction sample value.

In another example, an apparatus for decoding video data is provided that comprises a memory configured to store at least one of a first neighboring block or a second neighboring block of a current block, and a video decoder comprising at least one of fixed-function or programmable circuitry. The video decoder is configured to predict an initial prediction sample value for a sample of a current block using an intra-prediction mode. The initial prediction sample value is predicted from at least one of a first neighboring block or a second neighboring block of the current block. The video decoder is further configured to determine one or more reference sample values from at least one line of multiple lines of reference samples, the multiple lines of reference samples being from at least one of the first neighboring block or the second neighboring block of the current block. The video decoder is further configured to determine a final prediction sample value for the sample of the current block. Determining the final prediction sample value includes modifying the initial prediction sample value using the one or more reference sample values. The video decoder is further configured to reconstruct the sample of the current block based on the final prediction sample value.

In another example, a non-transitory computer-readable medium is provided that has stored thereon instructions that, when executed by one or more processors, cause the one or more processor to: predict an initial prediction sample value for a sample of a current block using an intra-prediction mode, wherein the initial prediction sample value is predicted from at least one of a first neighboring block or a second neighboring block of the current block; determine one or more reference sample values from at least one line of multiple lines of reference samples, the multiple lines of reference samples being from at least one of the first neighboring block or the second neighboring block of the current block; determine a final prediction sample value for the sample of the current block, wherein determining the final prediction sample value includes modifying the initial prediction sample value using the one or more reference sample values; and reconstruct the sample of the current block based on the final prediction sample value.

In another example, an apparatus for decoding video data is provided. The apparatus includes means for predicting an initial prediction sample value for a sample of a current block using an intra-prediction mode. The initial prediction sample value is predicted from at least one of a first neighboring block or a second neighboring block of the current block. The apparatus further includes means for determining one or more reference sample values from at least one line of multiple lines of reference samples, the multiple lines of reference samples being from at least one of the first neighboring block or the second neighboring block of the current block. The apparatus further includes means for determining a final prediction sample value for the sample of the current block. Determining the final prediction sample value includes modifying the initial prediction sample value using the one or more reference sample values. The apparatus further includes means for reconstructing the sample of the current block based on the final prediction sample value.

According to at least one other example, a method of encoding video data is provided. The method includes predicting an initial prediction sample value for a sample of a current block using an intra-prediction mode. The initial prediction sample value is predicted from at least one of a first neighboring block or a second neighboring block of the current block. The method further includes determining one or more reference sample values from at least one line of multiple lines of reference samples, the multiple lines of reference samples being from at least one of the first neighboring block or the second neighboring block of the current block. The method further includes determining a final prediction sample value for the sample of the current block. Determining the final prediction sample value includes modifying the initial prediction sample value using the one or more reference sample values. The method further includes determining a residual value for a residual block based on the final prediction sample value and a value of the sample of the current block. The method further includes signaling information indicative of the residual value.

In another example, an apparatus for encoding video data is provided that comprises a memory configured to store at least one of a first neighboring block or a second neighboring block of a current block, and a video encoder comprising at least one of fixed-function or programmable circuitry. The video encoder is configured to predict an initial prediction sample value for a sample of a current block using an intra-prediction mode. The initial prediction sample value is predicted from at least one of a first neighboring block or a second neighboring block of the current block. The video encoder is further configured to determine one or more reference sample values from at least one line of multiple lines of reference samples, the multiple lines of reference samples being from at least one of the first neighboring block or the second neighboring block of the current block. The video encoder is further configured to determine a final prediction sample value for the sample of the current block. Determining the final prediction sample value includes modifying the initial prediction sample value using the one or more reference sample values. The video encoder is further configured to determine a residual value for a residual block based on the final prediction sample value and a value of the sample of the current block. The video encoder is further configured to signal information indicative of the residual value.

In another example, a non-transitory computer-readable medium is provided that has stored thereon instructions that, when executed by one or more processors, cause the one or more processor to: predict an initial prediction sample value for a sample of a current block using an intra-prediction mode, wherein the initial prediction sample value is predicted from at least one of a first neighboring block or a second neighboring block of the current block; determine one or more reference sample values from at least one line of multiple lines of reference samples, the multiple lines of reference samples being from at least one of the first neighboring block or the second neighboring block of the current block; determine a final prediction sample value for the sample of the current block, wherein determining the final prediction sample value includes modifying the initial prediction sample value using the one or more reference sample values; determine a residual value for a residual block based on the final prediction sample value and a value of the sample of the current block; and signal information indicative of the residual value.

In another example, an apparatus for encoding video data is provided. The apparatus includes means for predicting an initial prediction sample value for a sample of a current block using an intra-prediction mode. The initial prediction sample value is predicted from at least one of a first neighboring block or a second neighboring block of the current block. The apparatus further includes means for determining one or more reference sample values from at least one line of multiple lines of reference samples, the multiple lines of reference samples being from at least one of the first neighboring block or the second neighboring block of the current block. The apparatus further includes means for determining a final prediction sample value for the sample of the current block. Determining the final prediction sample value includes modifying the initial prediction sample value using the one or more reference sample values. The apparatus further includes means for determining a residual value for a residual block based on the final prediction sample value and a value of the sample of the current block. The apparatus further includes means for signaling information indicative of the residual value.

In some aspects, the at least one line of the multiple lines of reference samples used for determining the one or more reference sample values is not adjacent to the current block.

In some aspects, the at least one line of the multiple lines of reference samples includes at least one of a line of reference samples above the current block or a line of reference samples on a left side of the current block. In some examples, at least one of the line of reference samples above the current block includes a line other than a nearest line above the current block or the line of reference samples on the left side of the current block includes a line other than a nearest line on the left side of the current block. In some examples, the line of reference samples above the current block includes a line other than a nearest line above the current block, and the line of reference samples on the left side of the current block includes a line other than a nearest line on the left side of the current block.

In some aspects, the initial prediction sample value is predicted from one or more lines of the multiple lines of reference samples. In some cases, a first line of reference samples used for determining the one or more reference sample values is different than a second line of reference samples used for predicting the initial prediction sample value. In some examples, the first line of reference samples used for determining the one or more reference sample values includes a nearest line above the current block or a nearest line on a left side of the current block. In some examples, the second line of reference samples used for predicting the initial prediction sample value includes a line other than a nearest line above the current block or a line other than a nearest line on the left side of the current block.

In some aspects, the methods, apparatuses, and computer-readable media described above for decoding and/or encoding video data further comprise determining, for the current block, a prediction block including a plurality of prediction samples based on the intra-prediction mode. The initial prediction sample value is predicted from the plurality of prediction samples from the prediction block.

In some aspects, modifying the initial prediction sample value using the one or more reference sample values includes determining a weighted combination of the initial prediction sample value and the one or more reference sample values. In some cases, the methods, apparatuses, and computer-readable medium described above for decoding video data further comprise determining a plurality of weights based on an x-coordinate and a y-coordinate of a sample associated with the initial prediction sample value. In such cases, the weighted combination is based on the one or more reference sample values, the plurality of weights, and the initial prediction sample value.

In some aspects, the methods, apparatuses, and computer-readable medium described above for decoding video data further comprise: obtaining an encoded video bitstream including signaling information, the signaling information indicating the at least one line of the multiple lines of reference samples to use for determining the one or more reference sample values; and processing the signaling information to determine the one or more lines of reference samples to use for determining the one or more reference sample values.

In some aspects, the methods, apparatuses, and computer-readable medium described above for encoding video data further comprise generating an encoded video bitstream including signaling information, the signaling information indicating the at least one line of the multiple lines of reference samples to use for determining the one or more reference sample values.

In some examples, the signaling information includes an index to a set of pre-determined lines. The set of pre-determined lines correspond to the one or more lines of reference samples to use for determining the one or more reference sample values. In some examples, the signaling information includes an index to a derived list of one or more lines. The derived list of one or more lines corresponds to the one or more lines of reference samples to use for determining the one or more reference sample values. In some examples, the signaling information is signaled in the encoded video bitstream independently for a line above the current block and for a line on a left side of the current block. In some examples, the signaling information includes a set of weights for use in determining the final prediction sample value. The set of weights is selected from multiple sets of weights based on the at least one line of the multiple lines of reference samples used for determining the one or more reference sample values.

In some aspects, the methods, apparatuses, and computer-readable medium described above for decoding video data further comprise deriving, based on a type of the intra-prediction mode, a location of a reference sample from the at least one line of the multiple lines of reference samples. The reference sample is associated with a reference sample value of the one or more reference sample values. In some examples, the location is derived based on a distance of the reference line from an edge of the current block and an angle associated with the type of the intra-prediction mode.

In some aspects, the methods, apparatuses, and computer-readable media described above for decoding and/or encoding video data further comprise deriving a reference sample value of the one or more reference sample values from the at least one line of the multiple lines of reference samples. The reference sample value is derived by interpolating the reference sample value from a neighborhood of reference sample values around the reference sample value.

In some aspects, the methods, apparatuses, and computer-readable media described above for decoding and/or encoding video data further comprise deriving, based on a type of the intra-prediction mode, the at least one line of the multiple lines of reference samples to use for determining the one or more reference sample values.

In some aspects, determining the one or more reference sample values includes determining a weighted average of samples from two or more lines of the multiple lines of reference samples.

In some aspects, the apparatus for decoding video data comprises a display configured to display the current block. In some aspects, the apparatus comprises one or more of a camera, a computer, a mobile device, a broadcast receiver device, or a set-top box.

In some aspects, the apparatus for encoding video data comprises a display configured to display the current block. In some aspects, the apparatus comprises one or more of a camera, a computer, a mobile device, a broadcast receiver device, or a set-top box.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 7 is a flow diagram illustrating an example of a process for decoding video data, in accordance with some examples;

FIG. 8 is a flow diagram illustrating an example of a process for encoding video data, in accordance with some examples.

DETAILED DESCRIPTION

Figure 1:
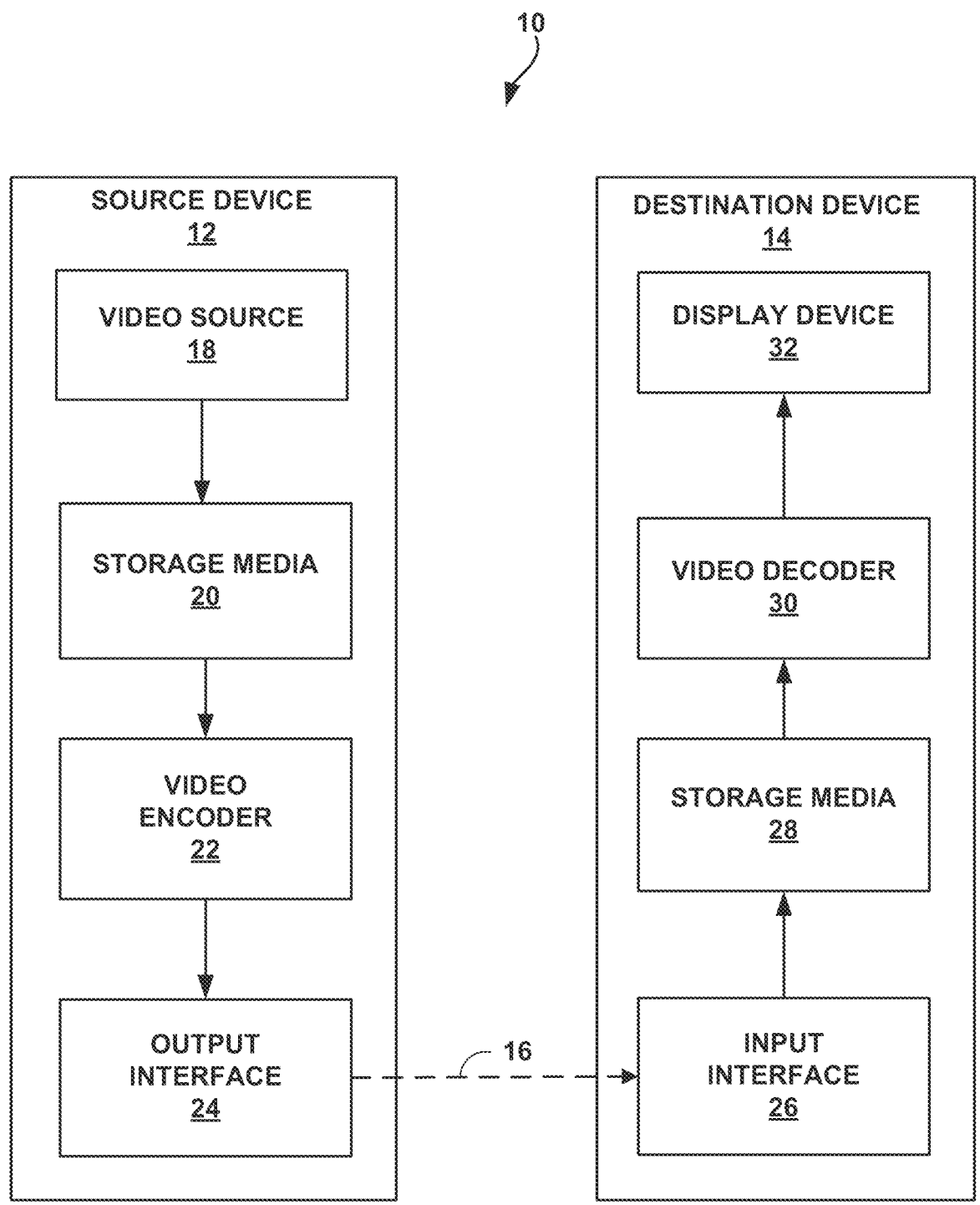
FIG. 1 is a block diagram illustrating an example video encoding and decoding system configured to implement techniques of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The techniques described herein can be performed using any coding device, such as an image coder (e.g., a JPEG encoder and/or decoder, or the like), a video coder (e.g., a video encoder and/or video decoder), or other suitable coding device.

Video coding devices (also referred to as video coders) implement video compression techniques to encode and decode video data efficiently. Video compression techniques may include applying different prediction modes, including spatial prediction (e.g., intra-frame prediction or intra prediction), temporal prediction (e.g., inter-frame prediction or inter prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values (or sample values) in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

This disclosure describes systems and techniques for coding one or more samples and/or blocks of video data using intra prediction and Position Dependent (Intra) Prediction Combination (PDPC) approach. For example, an intra-prediction mode for coding video content can be performed, where multiple reference lines from a neighboring reconstructed block may be used by the intra-prediction mode to generate a prediction block of prediction samples. Such an intra-prediction mode is referred to herein as multiple reference lines (MRL) intra-prediction mode. The MRL mode can be combined with other intra-prediction modes, such as Planar mode (e.g., intra mode 1), DC mode (e.g., intra mode 1), and/or one of the angular modes (vertical, horizontal, and variations thereof, such as any of intra modes 2-34). The systems and techniques described herein describe an intra-prediction mode that uses PDPC with multiple reference lines. For example, a PDPC approach is described when multiple reference lines are used for generating intra-coded prediction samples and/or when multiple reference lines are used for generating PDPC reference samples that are then used to modify the intra-coded prediction samples.

The systems and techniques described herein introduce compression efficiency generally in coding a sample and/or block of video data. For example, compression efficiency is provided for a PDPC approach by use of multiple reference lines that are in a neighborhood of the current block (e.g., a line immediately adjacent to the current block, a second line from the current block, a third line from the current block, and/or other adjacent line). Compression efficiency is a generally desirable goal in advancing the state of existing video coding techniques.

As used in this disclosure, the term video coding generically refers to either video encoding or video decoding. Similarly, the term video coder may generically refer to a video encoder, a video decoder, or a combined video encoder-decoder (CODEC). Moreover, certain techniques described in this disclosure with respect to video decoding may also apply to video encoding, and vice versa. For example, video encoders and video decoders can be configured to perform the same process, or reciprocal processes. Also, video encoders typically perform video decoding as part of the processes of determining how to encode video data. Thus, unless stated to the contrary, it should not be assumed that a technique described with respect to video decoding cannot also be performed as part of video encoding, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed.

FIG. 1 is a block diagram illustrating an example video encoding and decoding system 10 that may utilize techniques of this disclosure for coding one or more samples and/or blocks of video data. In some examples, the video encoding and decoding system 10 can code the video data using a PDPC approach when multiple reference lines are used for generating intra-coded prediction samples and/or for generating PDPC reference samples used for modifying the intra-coded prediction samples. The MRL mode includes using multiple reference lines that are in the neighborhood of the current block.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (e.g., a device or apparatus for decoding video data).

In the example of FIG. 1, source device 12 includes a video source 18, a storage media 20 configured to store video data, a video encoder 22, and an output interface 24. Destination device 14 includes an input interface 26, storage meda 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device or apparatus. Although generally the techniques of this disclosure are performed by a video encoding device and a video decoding device, the techniques may also be performed by a combined video encoder/decoder, typically referred to as a "CODEC." Source device 12 and destination device 14 are merely examples of such coding devices in which source device 12 generates encoded video data for transmission to destination device 14. In some examples, source device 12 and destination device 14 operate in a substantially symmetrical manner such that each of source device 12 and destination device 14 includes video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data (e.g., encoded video data) may be output from output interface 24 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as over-the-air television broadcasts, cable television transmissions, satellite television transmissions, Internet streaming video transmissions, such as adaptive streaming techniques including dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 22 and video decoder unit 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. The video coding standard High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG). A recent HEVC draft specification, and referred to as HEVC WD hereinafter, is available from http://phenix.int-evry.fr/jct/doc_enduser/documents/14_Vienna/wg11/JCTVC-N1003-v1.zip.

Video encoder 22 and video decoder 30 may also operate in accordance with other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, MA, 9-18 Jan. 2019, JVET-M1001-v5 (hereinafter "VVC Draft 4"). The techniques of this disclosure, however, are not limited to any particular coding standard.

In HEVC, VVC, and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably.

Furthermore, in HEVC and other video coding specifications, to generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

If operating according to HEVC, to generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Syntax data within a bitstream may also define a size for the CTU. A slice includes a number of consecutive CTUs in coding order. A video frame or picture may be partitioned into one or more slices. As mentioned above, each tree block may be split into CUs according to a quad-tree. In general, a quad-tree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. In some examples of this disclosure, four sub-CUs of a leaf-CU may be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and subblocks thereof in H.264/AVC).

A CU includes a coding node as well as prediction units (PUs) and transform units (TUs) associated with the coding node. A size of the CU corresponds to a size of the coding node and may be, in some examples, square in shape. In the example of HEVC, the size of the CU may range from 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs. The TUs may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quad-tree structure, sometimes called a "residual quad tree" (RQT). The leaf nodes of the RQT may be referred to as TUs. Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a RQT, which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The TUs may be specified using an RQT (also referred to as a TU quad-tree structure), as discussed above. For example, a split flag may indicate whether a leaf-CU is split into four transform units. In some examples, each transform unit may be split further into further sub-TUs. When a TU is not split further, it may be referred to as a leaf-TU. Generally, for intra coding, all the leaf-TUs belonging to a leaf-CU contain residual data produced from the same intra prediction mode. That is, the same intra-prediction mode is generally applied to calculate predicted values that will be transformed in all TUs of a leaf-CU. For intra coding, video encoder 22 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective RQT structures. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU).

As discussed above, video encoder 22 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 and video decoder 30 may be configured to operate according to VVC. According to VVC, a video coder (such as video encoder 22) partitions a picture into a plurality of coding tree units (CTUs). Video encoder 22 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 22 and video decoder 30 may use a single QTBT or MTT structure to represent each of the luminance and chrominance components, while in other examples, video encoder 22 and video decoder 30 may use two or more QTBT or MTT structures, such as one QTBT/MTT structure for the luminance component and another QTBT/MTT structure for both chrominance components (or two QTBT/MTT structures for respective chrominance components).

Video encoder 22 and video decoder 30 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU. After video encoder 22 generates predictive blocks (e.g., luma, Cb, and Cr predictive blocks) for one or more PUs of a CU, video encoder 22 may generate one or more residual blocks for the CU. For instance, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. Each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, as discussed above, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU.

Video encoder 22 may apply one or more transforms to a Cr transform block of a TU to generate a Cr coefficient block for the TU.

In some examples, video encoder 22 skips application of the transforms to the transform block. In such examples, video encoder 22 may treat residual sample values in the same way as transform coefficients. Thus, in examples where video encoder 22 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), video encoder 22 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 22 may quantize transform coefficients of the coefficient block. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) or other entropy coding techniques on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 22. Video decoder 30 may decode the bitstream to reconstruct pictures of the video data. As part of decoding the bitstream, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The techniques disclosed herein are built upon block-based intra prediction which is part of video standards including AVC, HEVC, and VVC. In block-based intra prediction, typically, lines of reference samples from adjacent reconstructed blocks are used for predicting samples within the current block. One or multiple lines of samples may be used for prediction. The reference samples are employed by typical intra-prediction modes such as DC, Planar, and angular/directional modes.

Intra prediction performs image block prediction using the block's spatially neighboring reconstructed image samples. With intra prediction, an N×M (e.g., 4×4) block is predicted by the above and left neighboring reconstructed samples (reference samples) along a selected prediction direction. As one example, the block is predicted by the above and left neighboring reconstructed samples (i.e., reference samples) along a selected prediction direction. The reference samples are external to the block being predicted.

With the reference samples, a video encoder 22 constructs a prediction block having prediction samples based on the reference samples.

In general, intra prediction techniques, the video encoder 22 determines a residual block indicating differences between the prediction block and the current block (e.g., residual values indicating differences between prediction samples and samples of the current block), and signals information indicative of the residual values in the residual block. The video decoder 30 similarly determines the reference samples and constructs the prediction block. The video decoder 30 determines the residual values of the residual block based on the received information and adds the residual values of the residual block to the prediction samples of the prediction block to reconstruct the current block.

As described in more detail, the example techniques described in this disclosure modify one or more (e.g., all) of the prediction samples of the prediction block. The video encoder 22 may determine the residual values based on the modified prediction samples. The video decoder 30 may add the residual values to the modified prediction samples to reconstruct the current block.

There are a plurality of intra prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

To perform Planar prediction for an N×N block, for each sample $p_{xy}$ located at (x, y), the prediction sample value may be calculated by applying a bilinear filter to four specific neighboring reconstructed samples (used as reference samples for intra prediction). The four reference samples include the top-right reconstructed sample TR, the bottom-left reconstructed sample BL, and the two reconstructed samples located at the same column ($r_{x,-1}$) and row ($r_{-1,y}$) of the current sample. The Planar mode can be formulated as below:

$$p_{xy}=(N-x1)\cdot L+(N-y1)\cdot T+x1\cdot R+y1\cdot B)/(2\cdot N),$$

where x1=x+1, y1=y+1, R=TR and B=BL.

For DC mode, the prediction block is filled with the average value of the neighboring reconstructed samples. Generally, both Planar and DC modes are applied for modeling smoothly varying and constant image regions.

Figure 3:
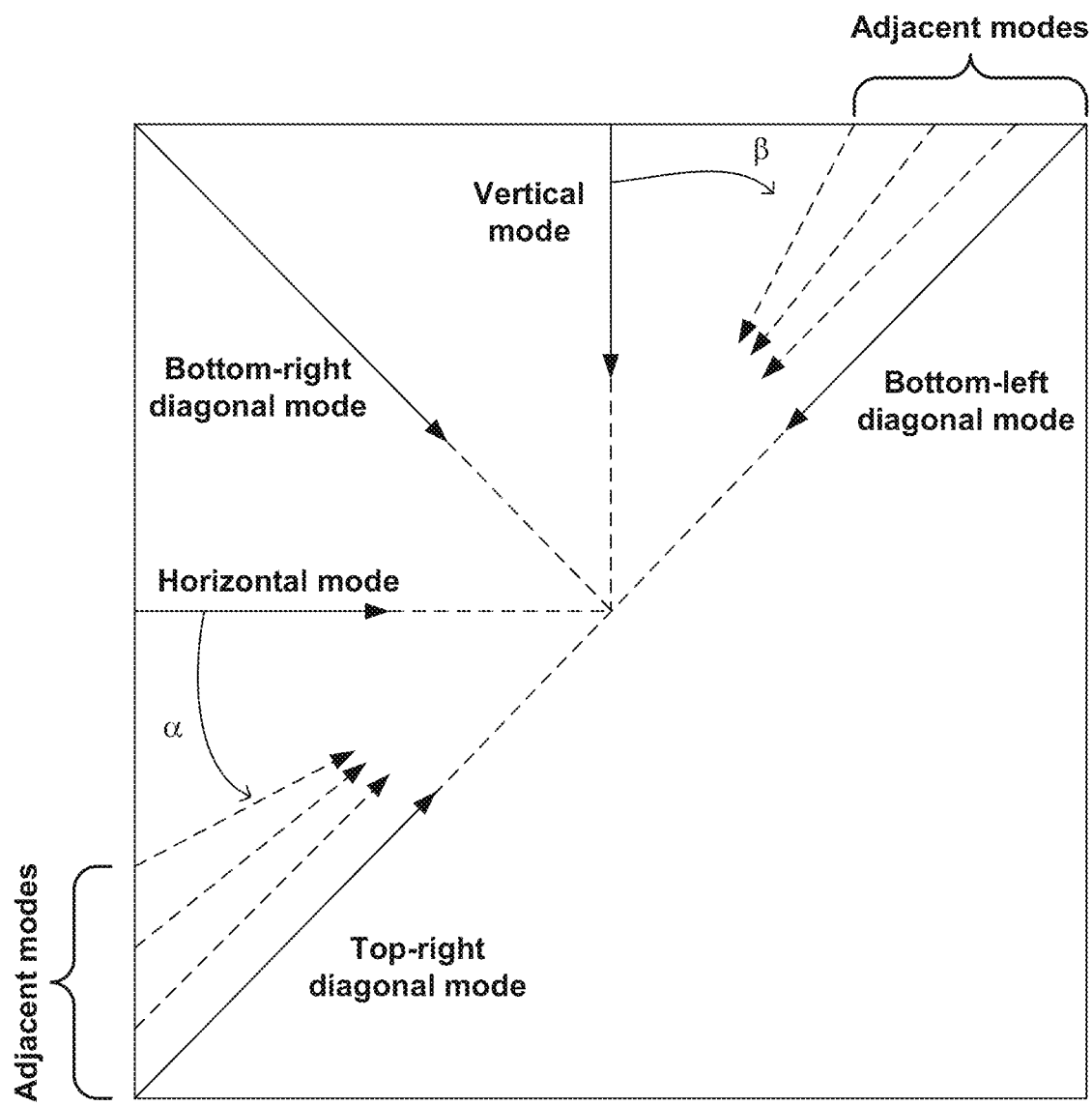
FIG. 3 is a conceptual diagram illustrating examples of intra prediction angular modes, in accordance with some examples.

For angular intra prediction modes in HEVC, which include 33 different prediction directions, the intra prediction process can be described as follows. For each given angular intra prediction mode, the intra-prediction direction can be identified accordingly; for example, intra mode 18 corresponds to a pure horizontal prediction direction, and intra mode 26 corresponds to a pure vertical prediction direction. Angular prediction modes are shown in FIG. 3. In some codecs, a different number of intra-prediction modes may be used. For example, in addition to Planar and DC modes, 65 angular modes may be defined, where mode 2 indicates a prediction direction of −135°, mode 34 indicates a prediction direction of −45°, and mode 66 indicates a prediction direction of 45°. In some codecs (e.g., VVC), angles beyond −135° (less than)−135° and beyond 45° (more than 45°) may also be defined; these may be referred to as wide-angled intra modes. Although the description herein is with respect to the intra mode design in HEVC (i.e., with 35 modes), the techniques disclosed may also apply to more intra modes including wide-angled intra modes.

Coordinates (x,y) of each sample of a prediction block are projected along a specific intra prediction direction (e.g., one of the angular intra prediction modes). For example, given a specific intra prediction direction, the coordinates (x, y) of a sample of the prediction block are first projected to the row/column of neighboring reconstructed samples along the intra prediction direction. In cases when (x,y) is projected to the fractional position a between two neighboring reconstructed samples L and R; then the prediction value for (x, y) may be calculated using a two-tap bi-linear interpolation filter, formulated as follows:

$$p_{xy}=(1-a)L+a\cdot R.$$

To avoid floating point operations, in HEVC, the above calculation may be approximated using integer arithmetic as:

$$p_{xy}=((32-a')\cdot L+a'\cdot a+16)>>5,$$

where a' is an integer equal to 32*a.

In some examples, before intra prediciton, the neighboring reference samples are filtered using a 2-Tap bilinear or 3-Tap (1,2,1)/4 filter, as known as intra reference smoothing, or mode-dependent intra smoothing (MDIS). When doing intra prediciton, given the intra prediction mode index (predModeIntra) and block size (nTbS), it is decided whether a reference smoothing process is performed and which smoothing filter is used. The intra prediction mode index is an index indicating an intra prediction mode.

The prediction samples of a prediction block are generated using the above example techniques. After the prediction samples are generated, one or more of the prediction samples may be modified using Position Dependent (Intra) Prediction Combination (PDPC). Forms of PDPC are described in ITU-T SG16/Q6 Doc. COM16-C1046, "Position Dependent intra Prediction Combination (PDPC), and X. Zhao, V. Seregin, A. Said, M. Karczewicz, "EE1 related: Simplification and extension of PDPC", 8th JVET Meeting, Macau, October 2018, JVET-H0057, which is hereby incorporated by reference in its entirety and for all purposes. Disclosed in that document is the introduction of PDPC applied to Planar, DC, horizontal and vertical modes without signaling as summarized in the following.

The prediction sample pred(x,y) located at (x, y) is predicted with an intra-prediction mode (e.g., Planar, DC, or angular) and its value is modified using the PDPC expression for a single reference sample line:

$$\text{pred}(x,y)=wL\times R_{-1,y}+wT\times R_{x,-1}wTL\times R_{-1,-1}+((64-wL-wT+wTL)\times\text{pred}'(x,y)+32)>>6, \quad \text{(Equation 1)}.$$

Figure 2A:
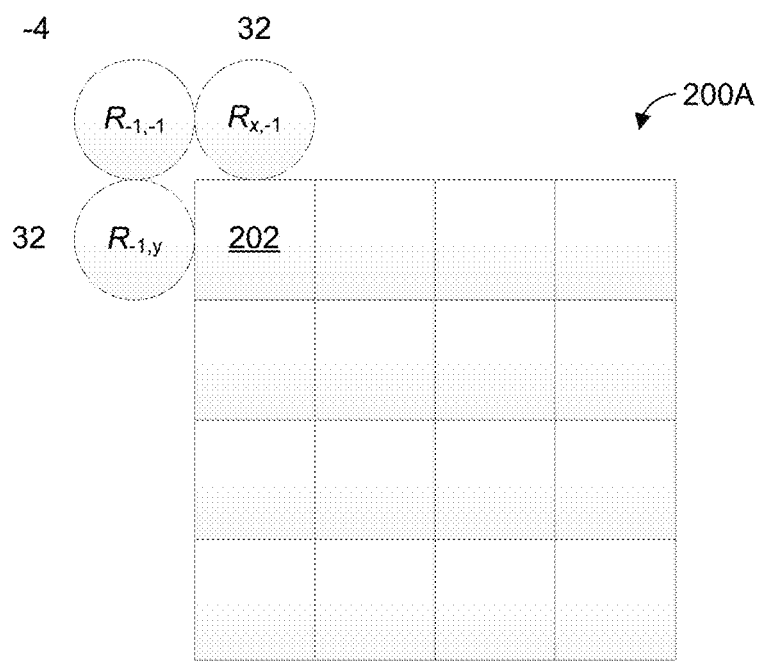
FIGS. 2A and 2B are conceptual diagrams illustrating examples of DC mode Position Dependent (Intra) Prediction Combination (PDPC) weights for prediction sample positions inside a 4×4 block, in accordance with some examples.

In equation 1, pred'(x,y) is the value of the prediction sample determined using an intra-prediction mode as described above for generating prediction samples, and pred(x,y) is the modified value of pred'(x,y). The terms $R_{x,-1}$ and $R_{-1,y}$ represent the reference samples located at the top and left of current sample (x, y) (the adjacent top and left samples external to the current block), respectively, and the term $R_{-1,-1}$ represents the reference sample located at the top-left corner of the current block (the adjacent top-left corner external to the current block). For instance, as shown in FIG. 2A (described below), from the perspective of a first prediction sample 202 located in a top-left corner of a block 200A, $R_{x,-1}$ represents a sample that is one row above the current block with the same x-coordinate as the x-coordinate of the prediction sample being modified (corresponding to the value pred'(x,y)), $R_{-1,y}$ represents a sample that is one column to the left of (or "on a left side of") the current block with the same y-coordinate as the y-coordinate of the prediction sample being modified, and $R_{-1,-1}$ represents a sample that is one column to the left of the current block and one row above the current block.

The samples (e.g., reference samples used for PDPC) that are being used to modify the prediction sample (generated using the intra-prediction mode) are samples in the picture (e.g., luma and chroma samples), and not necessarily other prediction samples (although possible). For example, for a current block being intra predicted that has a size of N×M, the video encoder 22 and/or the video decoder 30 may generate an N×M sized prediction block. The reference samples used to modify the prediction samples are those of the current picture that includes the current block and are external to the current block (in one or more neighboring blocks of the current block).

The coordinate system for identifying the samples external to the current block are relative to the current block. For example, the sample located at the top-left corner of the current block has a coordinate of (0, 0). The video encoder 22 may determine a residual between the prediction sample located at the top-left corner of the prediction block (e.g., having coordinate (0, 0)) and the sample in the current block having coordinate (0, 0). To reconstruct the sample located at (0, 0) in the current block, the video decoder 30 may add the prediction sample located at (0, 0) in the prediction block to the residual value corresponding to the sample located at (0, 0). Accordingly, for each sample in the current block, there is a corresponding sample in the prediction block (e.g., having a same coordinate).

Accordingly, $R_{x,-1}$ means that the y-coordinate is −1, and therefore refers to a sample in the row that is above the current block. The x-coordinate may be the same as the x-coordinate of the prediction sample that is being modified. For $R_{-1,y}$, the x-coordinate is −1, and therefore refers to a column that is to the left of the current block. The y-coordinate may be the same as the y-coordinate of the prediction sample that is being modified.

It may be possible to use a different coordinate system as well, such as a coordinate system where the (0, 0) coordinate refers to the top-right sample of the picture. The example techniques are described with respect to a coordinate system where the (0, 0) coordinate refers to the top-left sample of the block.

For the DC mode, the weights are calculated as follows for a block with dimensions width and height:

$$wT=32>>((y<<1)>>\text{shift}), wL=32>>((x<<1)>>\text{shift}),$$
$$wTL=(wL>>4)+(wT>>4), \quad \text{(Equation 2)}.$$

In equation 2, shift=$(\log_2 (\text{width}) + \log_2 (\text{height})+2) >> 2$. For Planar mode wTL=0, for horizontal mode wL=0 and wTL=wT, and for vertical mode wT=0 and wTL=wL. In some cases, the PDPC weights can be calculated with adds and shifts only. The value of pred(x,y) can be computed in a single step using Equation 1.

FIG. 2A is a diagram illustrating DC mode PDPC weights (wL, wT, wTL) for a first prediction sample 202 (at sample position (0, 0)) inside one 4×4 block 200A. As shown, the weight wL for the $R_{-1,y}$ PDPC reference sample is 32, the weight wT for the $R_{x,-1}$ PDPC reference sample is 32, and the weight wTL for the $R_{-1,-1}$ PDPC reference sample is −4. The weights (wL, wT, wTL) can be determined according to equation 2 above. As shown in equation 2, the weights are determined based on the position (x,y) of the prediction sample pred(x,y) in the current block.

Figure 2B:
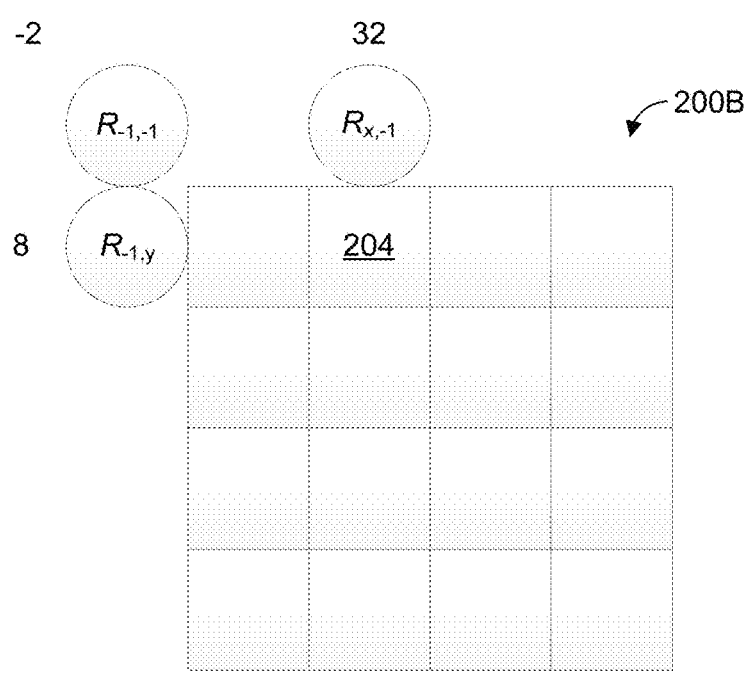

FIG. 2B illustrates DC mode PDPC weights (wL, wT, wTL) for sample position (1, 0) inside one 4×4 block. As shown, the weight wL for the $R_{-1,y}$ PDPC reference sample is 8, the weight wT for the $R_{x,-1}$ PDPC reference sample is 32, and the weight wTL for the $R_{-1,-1}$ PDPC reference sample is −2. The weights (wL, wT, wTL) can be determined according to equation 2 above.

In some cases, if PDPC is applied to DC, Planar, horizontal, and vertical intra modes, additional boundary filters are not applied, such as the DC mode boundary filter or horizontal/vertical mode edge filters.

In some cases, PDPC can be extended to angular modes generally (e.g., to the diagonal intra modes and to the angular modes that are adjacent to the diagonal modes). The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode. FIG. 3 illustrates the identification of the angular modes as disclosed herein. In general, the adjacent modes may be a selected subset of available angular modes. The spacing between angular modes may, for example, be nonuniform and some angular modes may, for example, be skipped.

In some examples, the video encoder 22 and the video decoder 30 can be configured to perform PDPC where the current block is intra predicted in an angular mode that excludes DC, planar, vertical, or horizontal modes. As one example, the video encoder 22 can be configured to determine a prediction block (which includes a plurality of prediction samples) for a current block based on an angular intra-prediction mode that is not a DC, planar, horizontal, or vertical intra-prediction mode, and to modify a prediction sample of the prediction block to generate a modified prediction sample using PDPC. It should be understood that although the techniques are described with respect to one prediction sample, the example techniques are not so limited. In some examples, video encoder 22 may modify the other prediction samples of the prediction block using PDPC.

To modify the prediction sample, the video encoder 22 can determine one or more reference samples that are external to the current block based on the angular intra prediction mode, and can modify the prediction sample to generate the modified prediction sample based on the determined one or more reference samples. The video encoder 22 can determine a residual value for a residual block based on the modified prediction sample and a sample value in the current block and signal information indicative of the residual value.

As another example, the video decoder 30 can be configured to determine a prediction block, which includes a plurality of prediction samples, for a current block based on an angular intra prediction mode that is not a DC, planar, horizontal, or vertical intra prediction mode and to modify a prediction sample of the prediction block to generate a modified prediction sample using PDPC. Similar to above, although the techniques are described with respect to one prediction sample, the example techniques are not so limited. In some examples, the video decoder 30 may modify the other prediction samples of the prediction block using PDPC.

To modify the prediction sample, the video decoder 30 can be configured to determine one or more reference samples that are external to the current block based on the angular intra prediction mode and modify the prediction sample to generate the modified prediction sample based on the determined one or more reference samples. The video decoder 30 can also be configured to reconstruct a sample of the current block based on the modified prediction sample and a residual value.

Figure 4A:
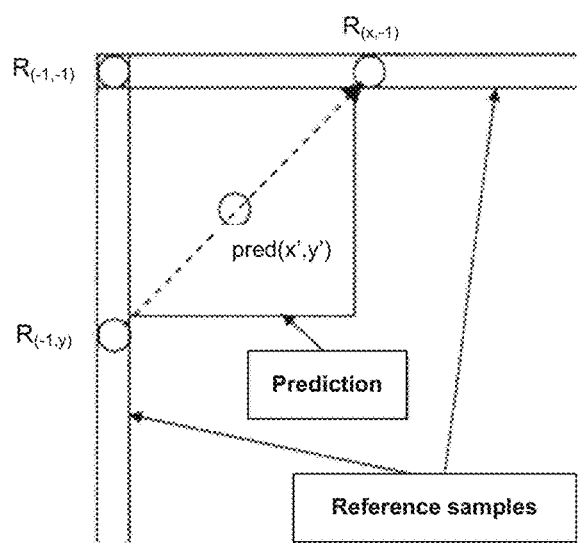
FIG. 4A is a conceptual diagram illustrating an example of a diagonal top-right mode, in accordance with some examples.

FIG. 4A-FIG. 4D illustrate definitions of samples used by PDPC extended to diagonal and adjacent angular intra modes. FIG. 4A illustrates the definition of reference samples Rx,−1, R−1,y, and R−1,−1 for the extension of PDPC to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1. The PDPC weights for the top-right diagonal mode are, for example: wT=16>> ((y'<<1)>>shift), wL=16>>((x'<<1)>>shift), wTL=0.

Figure 4B:
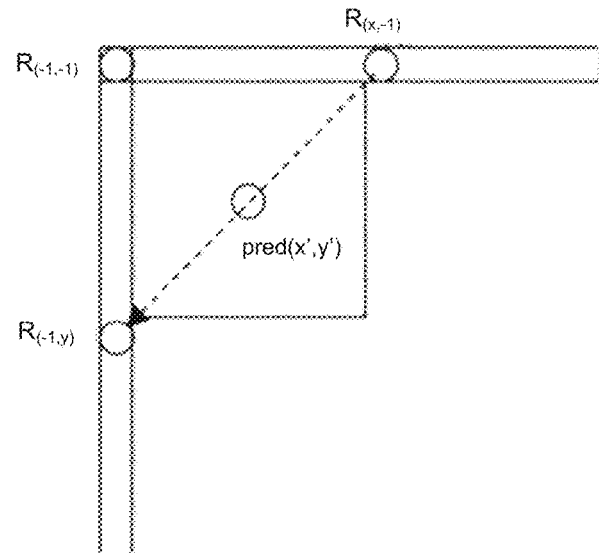
FIG. 4B is a conceptual diagram illustrating an example of a diagonal bottom-left mode, in accordance with some examples.

FIG. 4B illustrates the definition of reference samples Rx,−1, R−1,y, and R−1,−1 for the extension of PDPC to the bottom-left diagonal mode. The coordinate x of the reference sample Rx,−1 is given by: x=x'+y'+1, and the coordinate y of the reference sample R−1,y is given by: y=x'+y'+1. The PDPC weights for the top-right diagonal mode are, for example: wT=16>> ((y'<<1)>>shift), wL=16>> ((x'<<1)>> shift), wTL=0.

In FIG. 4A and FIG. 4B, the video encoder 22 and the video decoder 30 can each determine a row that is above the current block (e g, immediately above but the techniques are not so limited) and determine an x-coordinate in the determined row. The x-coordinate in the determined row is equal to an x-coordinate of the prediction sample plus a y-coordinate of the prediction sample plus 1. The video encoder 22 and the video decoder 30 can determine a reference sample of the one or more reference samples based on the determined row and the determined x-coordinate.

Similarly, in FIG. 4A and FIG. 4B, the video encoder 22 and the video decoder 30 can determine a column that is to the left of the current block (e g, immediately to the left but the techniques are not so limited) and can determine a y-coordinate in the determined column. The y-coordinate in the determined column is equal to an x-coordinate of the prediction sample plus a y-coordinate of the prediction sample plus 1. The video encoder 22 and the video decoder 30 can determine a reference sample of the one or more reference samples based on the determined column and the determined y-coordinate.

Based on the determined x and y-coordinates, the video encoder 22 and the video decoder 30 can determine the reference samples (e.g., a first reference sample based on the determined row and determined x-coordinate and a second reference sample based on the determined column and determined y-coordinate). The video encoder 22 and the video decoder 30 can also determine the weights according to the above example techniques for the diagonal modes (e.g., top-right diagonal mode and bottom-left diagonal mode, as two examples). Then, based on Equation 1 (as one non-limiting example), the video encoder 22 and the video decoder 30 can determine the modified prediction sample (e.g., pred(x,y)).

Figure 4C:
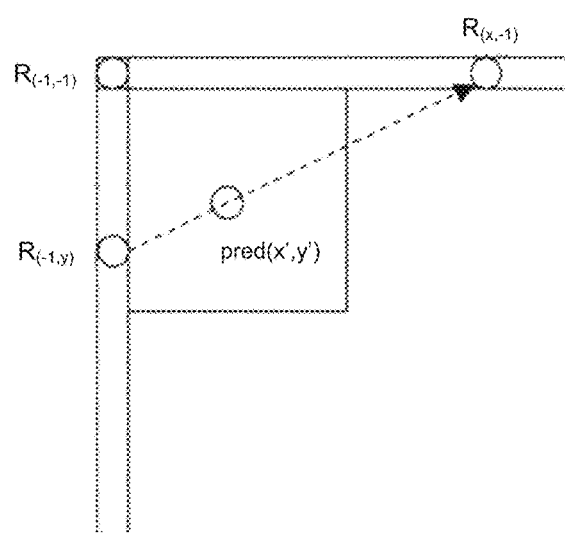
FIG. 4C is a conceptual diagram illustrating an example of an adjacent diagonal top-right mode, in accordance with some examples.

The case of an adjacent top-right diagonal mode is illustrated in FIG. 4C. In general, for the angle $\alpha$ defined in FIG. 3, the y-coordinate of the reference sample R−1,y is determined as follows: y=y'+tan($\alpha$)×(x'+1), and the x coordinate of Rx,−1 is given by: x=x'+cotan($\alpha$)×(y'+1), with tan($\alpha$) and cotan($\alpha$) the tangent and cotangent of the angle $\alpha$, respectively. The PDPC weights for an adjacent top-right diagonal mode are, for example: wT=32>> ((y'<<1)>>shift), wL=32>> ((x'<<1)>>shift), wTL=0 or wT=32>> ((y'<<1)>>shift), wL=0, wTL=0.

Figure 4D:
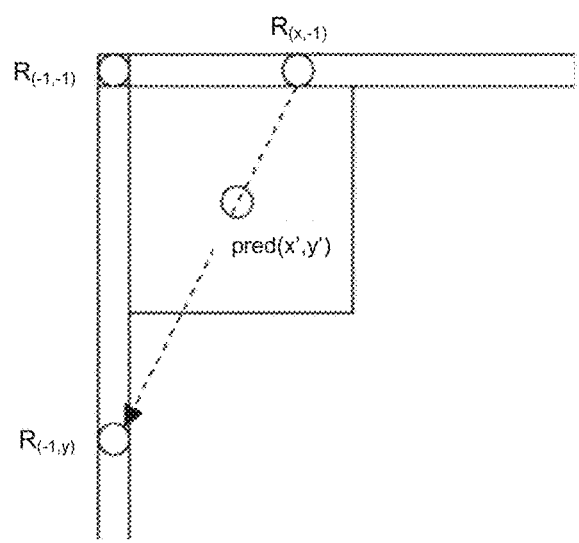
FIG. 4D is a conceptual diagram illustrating an example of an adjacent diagonal bottom-left mode, in accordance with some examples.

Similarly, the case of an adjacent bottom-left diagonal mode is illustrated in FIG. 4D. In general, for the angle $\beta$ defined in FIG. 3, the x coordinate of the reference sample Rx,−1 is determined as follows x=x'+tan($\beta$)×(y'+1), and the y coordinate of R−1,y is given by y=y'+cotan($\beta$)×(x'+1), with tan($\beta$) and cotan($\beta$) the tangent and cotangent of the angle $\beta$, respectively. The PDPC weights for an adjacent bottom-left diagonal mode are, for example: wL=32>> ((x'<<1)>>shift), wT=32>>((y'<<1)>>shift), wTL=0 or wL=32>> ((x'<<1)>>shift), wT=0, wTL=0.

In FIG. 4C and FIG. 4D, the video encoder 22 and the video decoder 30 can each determine a row that is above the current block (e g, immediately above but the techniques are not so limited) and can determine an x-coordinate in the determined row. The x-coordinate in the determined row is based on an angle of the angular intra prediction mode. The video encoder 22 and the video decoder 30 can determine a reference sample of the one or more reference samples based on the determined row and the determined x-coordinate.

To determine the x-coordinate in the determined row, the video encoder 22 and the video decoder 30 can determine one of a cotangent (e.g., for adjacent top-right diagonal mode) or tangent (e.g., for adjacent bottom-left diagonal mode) of the angle of the angular intra prediction mode. The video encoder 22 and the video decoder 30 can determine the x-coordinate in the determined row based on one of the cotangent or tangent of the angle of the angular intra prediction mode, an x-coordinate of the prediction sample, and a y-coordinate of the prediction sample. For instance, for adjacent top-right diagonal angular intra prediction mode, the x-coordinate in the determined row is equal to x'+cotan($\alpha$)×(y'+1) and for adjacent bottom-left diagonal mode, the x-coordinate in the determined row is equal to x'+tan($\beta$)×(y'+1), where x' and y' are the x and y-coordinates of the prediction sample being modified.

Similarly, in FIG. 4C and FIG. 4D, the video encoder 22 and the video decoder 30 can each determine a column that is to the left of the current block (e g, immediately to the left but the techniques are not so limited) and can determine a y-coordinate in the determined column. The y-coordinate in the determined column is based on an angle of the angular intra prediction mode. The video encoder 22 and the video decoder 30 can determine a reference sample of the one or more reference samples based on the determined column and the determined y-coordinate.

To determine the y-coordinate in the determined column, the video encoder 22 and the video decoder 30 can determine one of a cotangent (e.g., for adjacent bottom-left diagonal mode) or tangent (e.g., for adjacent top-right diagonal mode) of the angle of the angular intra prediction mode. The video encoder 22 and the video decoder 30 can determine the y-coordinate in the determined column based on one of the cotangent or tangent of the angle of the angular intra prediction mode, an x-coordinate of the prediction sample, and a y-coordinate of the prediction sample. For instance, for adjacent top-right diagonal angular intra prediction mode, the y-coordinate in the determined column is equal to y'+tan(α)×(x'+1) and for adjacent bottom-left diagonal mode, the y-coordinate in the determined column is equal to y'+cotan(β)×(x'+1), where x' and y' are the x and y-coordinates of the prediction sample being modified.

Based on the determined x and y-coordinates, the video encoder 22 and the video decoder 30 can determine the reference samples (e.g., a first reference sample based on the determined row and determined x-coordinate and a second reference sample based on the determined column and determined y-coordinate). The video encoder 22 and the video decoder 30 can also determine the weights according to the above example techniques for the adjacent diagonal modes (e.g., adjacent top-right diagonal mode and adjacent bottom-left diagonal mode, as two examples). Then, based on Equation 1 (as one non-limiting example), the video encoder 22 and the video decoder 30 can determine the modified prediction sample (e.g., pred(x,y)).

The above describes example techniques for the top-right and bottom-left diagonal modes and the adjacent top-right and adjacent bottom-left diagonal modes as example angular modes for which PDPC can be applied. The example techniques may be extended to other angular modes as well. Also, in some examples, the one or more reference samples have both an x- and y-coordinate that is different than both an x- and y-coordinate of the prediction sample in the prediction block. For instance, in the above example equations to determine the x and y coordinates in respective rows and columns to determine the reference samples, the x-coordinate is different than the x-coordinate of the prediction sample being modified, and the y-coordinate is different than the y-coordinate of the prediction sample being modified. That is, the reference samples may not be in the same row or same column as the prediction sample being modified.

As is the case for DC, planar, horizontal and vertical mode PDPC, there is no additional boundary filtering, for example as specified in 'J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001, for diagonal and adjacent diagonal modes when PDPC is extended to these angular modes.

As described above, PDPC can be applied to angular intra prediction modes with minimal impact to complexity. In a practical implementation, the values of the tangents and cotangents of angles can be stored in tables so that they are not computed on the fly (e.g., at run-time). The following are example tables for 129 angular modes in total:

TanAngTable[33]={0, 1, 2, 3, 4, 5, 6, 8, 10, 12, 14, 16, 18, 20, 22, 24, 26, 28, 30, 32, 34, 36, 38, 40, 42, 44, 46, 49, 52, 55, 58, 61, 64}.

CotanAngTable[33]={0, 65536, 32768, 21845, 16384, 13107, 10923, 8192, 6554, 5461, 4681, 4096, 3641, 3277, 2979, 2731, 2521, 2341, 2185, 2048, 1928, 1820, 1725, 1638, 1560, 1489, 1425, 1337, 1260, 1192, 1130, 1074, 1024}.

Moreover, the tables may already be employed by the angular intra prediction of blocks and can be reused for the PDPC extension to diagonal and adjacent modes (e.g., the angular intra prediction modes). Therefore, no additional tables may be required in the implementation of PDPC. In some examples, custom tables can be produced, for example by training, to further optimize PDPC.

In some cases, all horizontal angular modes are mapped to vertical modes by flipping the block around the bottom-right diagonal. The symmetry around the vertical mode allows the number of angles to be further reduced to 33 with stored tangent and cotangent values in the TanAngTable and CotanAngTable, respectively. Due to required integer precision, the values in both tables are scaled by factor 64 in case of TanAngTable and value 1024 in case of CotanAngTable. The multiplications in the formulas above for computing coordinates x and y are avoided by accumulating the table values corresponding with the angular mode with increasing x' and y' while traversing the prediction block.

Interpolation of the reference samples, for example, by linear or cubic interpolation, or nearest neighbor rounding may be used if fractional values are calculated. For example, to determine one or more reference samples that are external to the current block based on the angular intra prediction mode, the video encoder 22 and the video decoder 30 can be configured to determine a set of one or more samples based on the angular intra-prediction mode and to interpolate the set of one or more samples to generate the one or more reference samples. Interpolation is one example. In some examples, the video encoder 22 and/or the video decoder 30 can perform at least one of interpolation, rounding with offset, or rounding without offset. The video encoder 22 and/or the video decoder 30 can perform such rounding with or without offset based on neighboring samples in the set of one or more samples to generate the one or more reference samples.

Clipping may be required to prevent the access of reference samples outside the reference line buffer boundaries in case large coordinate values are computed. If clipping is performed, the last available reference sample may be used or PDPC may fall back to angular intra prediction only, which is equivalent to applying zero weights for wL, wT, wTL in Equation 1, for example. For instance, to determine one or more reference samples that are external to the current block based on the angular intra prediction mode, the video encoder 22 and the video decoder 30 can be configured to determine that one or more samples external to the current block identified based on the angular intra prediction mode are not stored in a reference line buffer and determine the one or more reference samples based on a last reference sample stored in the reference line buffer.

In some examples, rather than using the last sample in the reference line buffer, PDPC may be disabled for the current block or PDPC may be disabled for certain predicted samples such that normal intra prediction (e.g., without modified prediction samples) is used. As one example, for a prediction sample in the prediction block, the video encoder 22 and/or the video decoder 30 can determine that a first reference sample is available in the reference buffer but that a second reference sample is not available in the reference buffer. In this example, the video encoder 22 and/or the video decoder 30 can determine that PDPC is disabled for the prediction sample. However, in some examples, the video encoder 22 and/or the video decoder 30 can utilize the first reference sample for PDPC and not utilize the second reference sample (e.g., by setting a weight for the second reference sample equal to zero).

As described above, in some examples, the video encoder 22 and the video decoder 30 can perform the example PDPC techniques on a plurality of prediction samples in a prediction block. However, there may be instances where PDPC techniques are used on some of the prediction samples but not other prediction samples in the same prediction block. For example, assume that for a first prediction sample in a prediction block, the video encoder 22 and/or the video decoder 30 perform the PDPC techniques described herein.

However, for a second prediction sample in the same prediction block, assume that the reference samples needed for performing the PDPC techniques on the second prediction sample are not stored in the reference line buffer. In this example, for the second prediction sample, the video encoder 22 and/or the video decoder 30 may not perform PDPC techniques and normal intra-prediction techniques may be utilized. In some cases, for the second prediction sample, it may be possible that one of the reference samples is available in the reference line buffer but the other one is not. In some examples, the video encoder 22 and/or the video decoder 30 may not perform PDPC techniques on the second prediction sample or may utilize only the reference sample that is available and assign a zero weight to the weights applied to the reference sample that is not available.

Like the PDPC extension for diagonal and adjacent angular modes, PDPC can be extended to the angular modes that are adjacent to the horizontal and vertical modes. Adjacent angular modes in this case may refer to angular modes on both sides of horizontal and vertical modes. In case of adjacent horizontal angular modes, the x-coordinate of Rx,−1 is equal to the x-coordinate of pred(x,y). Example PDPC weights are: wT=16>>((y<<1)>>shift), wL=0, wTL=wT. In case of adjacent vertical angular modes, the y-coordinate of R−1,y is equal to the y coordinate of pred(x,y). Example PDPC weights are: wL=16>>((x<<1)>>shift), wT=0, wTL=wL.

As shown from the discussion above, PDPC uses samples that are present in the nearest line above and the nearest line to the left of the current block. Techniques and systems are described herein for extending PDPC to be used with multiple reference lines (e.g., MRL mode). Using such techniques, the video encoding and decoding system 10 can code video data using PDPC when multiple reference lines are used for generating intra-coded prediction samples and/or when multiple reference lines are used for generating the PDPC reference samples (which are then used for modifying the intra-coded prediction samples).

As one example, a video coder (e.g., video encoder 22 and/or video decoder 30) may be configured to determine a prediction block for a current block based on an intra-prediction mode. The intra-prediction mode can include any mode, such as Planar mode (e.g., mode 0), DC mode (e.g., mode 1), and/or any angular mode (e.g., horizontal, vertical, or variation of horizontal and vertical modes, including any of the intra-prediction modes 2-34). The prediction block includes multiple prediction samples. A prediction sample of the prediction block can be determined based on the intra-prediction mode using multiple reference lines (e.g., using MRL mode) in some cases.

There are several examples of intra-prediction modes that utilize MRL. One example includes selecting one or multiple of the lines from the neighborhood as the reference line(s) for the intra prediction. Another example of using MRL includes combining samples, potentially interpolated if at fractional positions (also referred to as non-integer positions), from two or more lines of samples to obtain a prediction of the intra-block samples corresponding to an intra-prediction mode (e.g., DC, Planar, horizontal (HOR)/vertical (VER), directional, or other mode) or to obtain a "reference line" that is then used for prediction of the samples. For example, instead of signaling and choosing a particular line from the multiple reference lines, the video coder could combine one or more lines into a single line, which is referred to as a new "reference line." The samples from the two or more lines can be combined by determining a weighted average of the samples, a non-linear combination of the samples, or other combination).

Figure 5A:
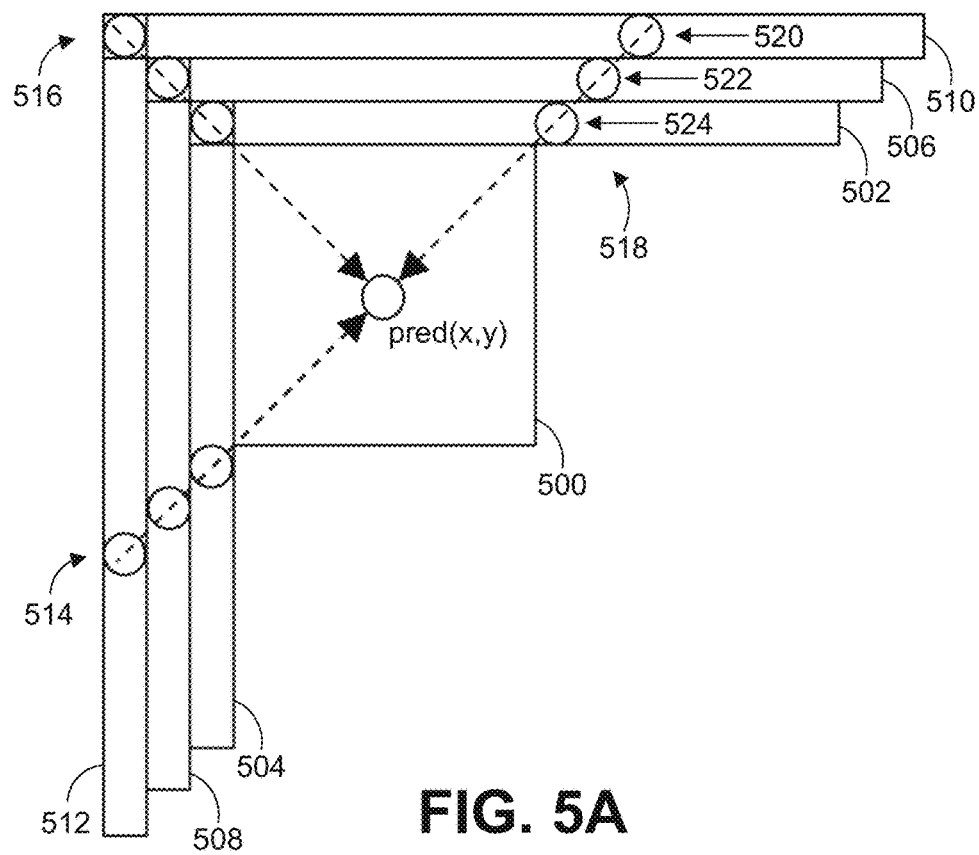
FIG. 5A is a conceptual diagram illustrating an example of an intra-prediction mode using multiple reference lines and PDPC, in accordance with some examples.
Figure 5B:
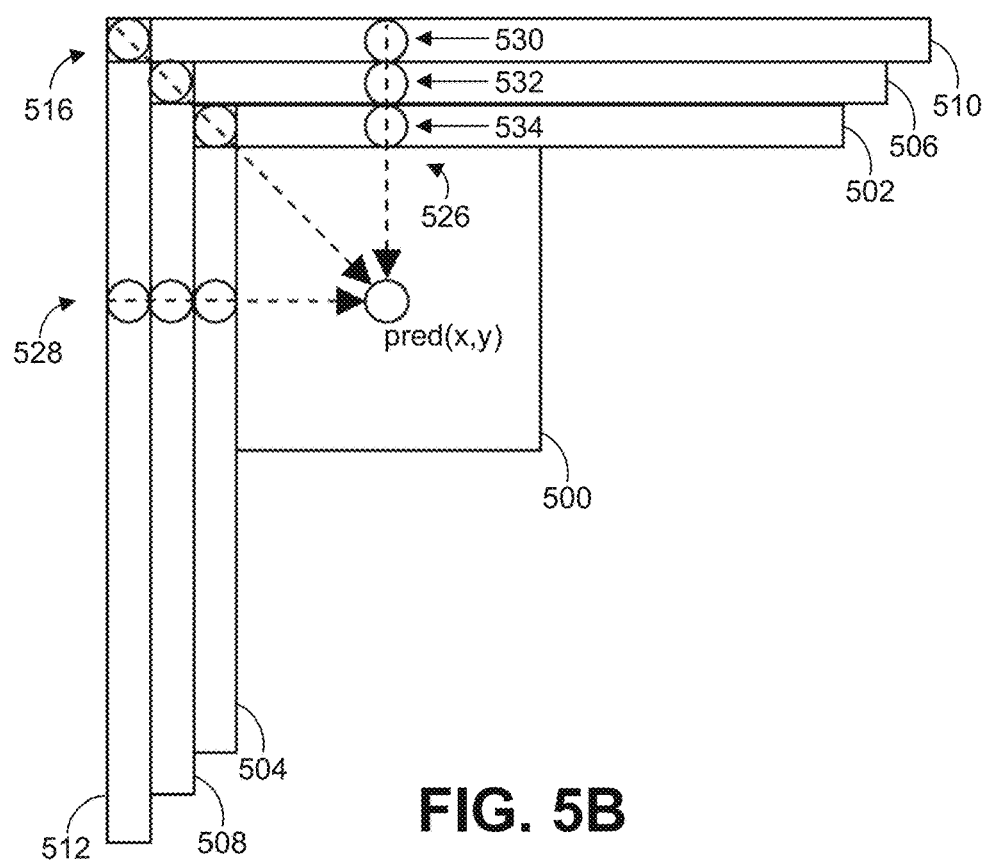
FIG. 5B is a conceptual diagram illustrating another example of an intra-prediction mode using multiple reference lines and PDPC, in accordance with some examples.

FIG. 5A and FIG. 5B are diagrams illustrating examples of intra prediction using multiple reference lines. Referring to FIG. 5A, the prediction sample of a current block 500 predicted using an intra-prediction mode is shown as pred (x,y). The intra-prediction mode used in the example of FIG. 5A can include the intra-prediction mode 2 (with a direction toward the group of reference samples 514 at an angle of −135° relative to pred(x,y)), the intra-prediction mode 18 (with a direction toward the group of reference samples 516 at an angle of −45° relative to pred(x,y)), and/or the intra-prediction mode 34 (with a direction toward the group of reference samples 518 at an angle of 45° relative to pred(x, y)).

The reference samples used for the intra prediction can be selected from any one of the lines 502, 504, 506, 508, 510, and/or 512 along the corresponding prediction direction. The adjacent line 502 includes a closest row of samples from a top neighboring block to the current block 500, and the adjacent line 504 includes a closest column of samples from a left neighboring block to the current block 500. The line 506 includes a second closest row of samples from the top neighboring block to the current block 500, and the line 508 includes the second closest column of samples from the left neighboring block to the current block 500. The line 510 includes a third closest row of samples from the top neighboring block to the current block 500, and the line 512 includes the third closest column of samples from the left neighboring block to the current block 500. In some cases, lines 502 and 504 are considered one line (line that is closest to the current block), lines 506 and 508 are considered another line (line that is at a distance of one sample away from the current block), and lines 510 and 512 are considered another line (line that is at a distance of two samples away from the current block).

In one example, intra-prediction mode 34 can be selected for performing intra prediction, and the line 510 can be selected as the line to be used for intra prediction. Because intra-prediction mode 34 was selected, the value of sample 520 can be used as the value of the prediction sample pred(x,y). In another example, intra-prediction mode 34 can be selected, and the lines 502, 506, and 510 can be selected for use in determining the value for the prediction sample pred(x,y). For example, the sample 520, the sample 522, and the sample 524 can be combined to obtain the value of the prediction sample pred(x,y). For instance, the samples 520, 522, and 524 can be combined by determining a weighted average of the samples, by determining a non-linear combination of the samples, or other combination.

In FIG. 5B, the intra-prediction mode can include the intra-prediction mode 26 (with a vertical direction toward the group of reference samples 526 relative to pred(x,y)), the intra-prediction mode 18 (with a direction toward the group of reference samples 516 at an angle of −45° relative to pred(x,y)), and/or the intra-prediction mode 10 (with a horizontal direction toward the group of reference samples 528 relative to pred(x,y)).

The reference samples used for the intra prediction can be selected from any one of the lines 502, 504, 506, 508, 510, and/or 512 along the corresponding prediction direction. In one example, intra-prediction mode 26 can be selected for performing intra prediction, and the line 510 can be selected as the line to be used for intra prediction. Based on the selection of intra-prediction mode 26, the value of sample 530 can be used as the value of the prediction sample pred(x,y). In another example, intra-prediction mode 26 can be selected, and the lines 502, 506, and 510 can be selected for use in determining the value for the prediction sample pred(x,y). For example, the sample 530, the sample 532, and the sample 534 can be combined to obtain the value of the prediction sample pred(x,y). For instance, the samples 530, 532, and 534 can be combined by determining a weighted average of the samples, by determining a non-linear combination of the samples, or other combination.

As described above, the video coder can modify a prediction sample of the prediction block to generate a modified prediction sample using Position Dependent Intra Prediction Combination (PDPC). For example, the video coder can determine a weighted combination of the prediction sample (e.g., pred'(x,y)) determined using intra prediction and one or more reference samples (e.g., $R_{-1,y}$, $R_{x,-1}$, and $R_{-1,-1}$) determined using PDPC. The weighted combination can be determined using equation 1 shown above. It should be understood that although the techniques are described with respect to one prediction sample, the example techniques are not so limited. In some examples, the video coder can modify the other prediction samples of the prediction block using PDPC.

To modify the prediction sample, the video coder can determine one or more reference samples that are external to the current block from multiple reference lines. When multiple reference lines are used to generate the PDPC reference samples, Equation 1 may be modified to include additional reference sample lines (e.g., not limited to samples one row above or one row left of the current block), as described below. In such cases, multiple reference samples are available in the neighborhoods of $R_{x,-1}$, $R_{1,-1}$, and each may have a weight assigned that can be optimized, for example, by training.

When performed by the video encoder 22, the video encoder 22 can determine a residual value for a residual block based on the modified prediction sample and a sample value in the current block (by determining the prediction error between the sample value and the modified prediction sample) and can signal information indicative of the residual value. When performed by the video decoder 30, the video decoder 30 can reconstruct a sample of the current block based on the modified prediction sample and a residual value.

However, there may be technical complexities in extending PDPC to cases when multiple reference lines are used. For example, in current video coding schemes, when an MRL mode is used for intra prediction, it is not clear which reference line(s) should be used with PDPC. Therefore, it may be uncertain which reference samples (e.g., $R_{x,-1}$, $R_{-1,y}$, $R_{-1,-1}$, or reference samples from other lines in the neighborhood of the current block, etc.) to use for modifying the prediction sample determined using intra prediction, making it difficult to gain video coding efficiencies that come with using PDPC. For example, if the information needed to signal residual values associated with a block is reduced, there is an increase in bandwidth efficiencies. Accordingly, the reference samples used to modify the prediction block should be such that the residual values generated from the modified prediction block require a lesser amount of information to be signaled, as compared to other techniques. However, if the determination of which reference samples to use is overly intensive, there may be latency in how long it takes video decoder 30 to reconstruct the current block.

This disclosure describes example techniques that provide a practical application to video coding techniques that combine PDPC with intra prediction modes and the use of multiple reference lines. The various methods can be performed independently or can be used in any suitable combination.

In some examples, the combination of intra prediction (e.g., using MRL mode or only the adjacent lines) and PDPC can be performed by using the samples belonging to the nearest line above and/or to the left of the current block for determining the PDPC reference samples. For instance, irrespective of which reference line is used for regular intra prediction, for PDPC, the adjacent reference line can always be used for PDPC. In such examples, the reference line used for regular intra prediction can be different than the reference line used for determining the PDPC reference samples. In one illustrative example, referring to FIG. 5A, intra prediction can use line 510 (the third closest line to the current block) to determine a value for the prediction sample pred(x,y), while the adjacent line 502 and/or the adjacent line 504 can be used to determine the PDPC reference samples.

Figure 6:
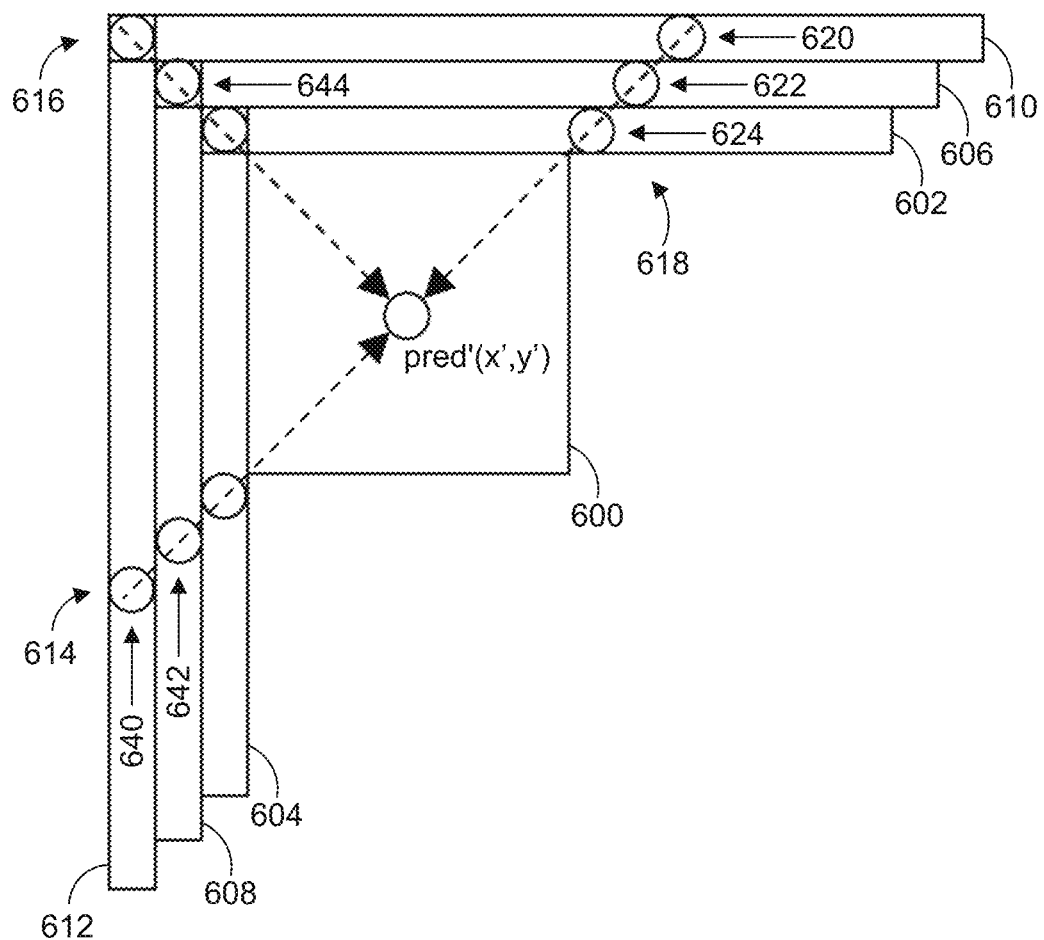
FIG. 6 is a conceptual diagram illustrating an example of an intra-prediction mode using multiple reference lines and PDPC, where PDPC is performed using multiple reference lines, in accordance with some examples.

In some examples, one or more samples belonging to a line that is in the neighborhood of the current block can be used for determining the PDPC reference samples. For example, the one or more samples can be selected from one or more lines of multiple reference lines from one or more reconstructed blocks neighboring a current block. FIG. 6 is a diagram illustrating an example of determining one or more PDPC reference samples from a line from one or more reconstructed blocks neighboring a current block 600. Intra prediction is performed using one or more adjacent lines or multiple reference lines. For example, the prediction sample of the current block 600 predicted using an intra-prediction mode is shown as pred'(x',y'). As noted above with reference to equation 1, the intra-predicted sample pred'(x',y') can be modified using the one or more PDPC reference samples to obtain pred(x,y).

The intra-prediction mode used in the example of FIG. 6 can include the intra-prediction mode 2 (with a direction toward the group of reference samples 614 at an angle of −135° relative to pred'(x',y')), the intra-prediction mode 18 (with a direction toward the group of reference samples 616 at an angle of −45° relative to pred'(x',y')), and/or the intra-prediction mode 34 (with a direction toward the group of reference samples 618 at an angle of 45° relative to pred'(x',y')). The reference samples used for the intra prediction can be selected from any one of the lines 602, 604, 606, 608, 610, and/or 612 along the corresponding prediction direction. The adjacent line 602 includes a closest row of samples from a top neighboring block to the current block 600, and the adjacent line 604 includes a closest column of samples from a left neighboring block to the current block 600. The line 606 includes a second closest row of samples from the top neighboring block to the current block 600, and the line 608 includes the second closest column of samples from the left neighboring block to the current block 600. The line 610 includes a third closest row of samples from the top neighboring block to the current block 600, and the line 612 includes the third closest column of samples from the left neighboring block to the current block 600.

In one example, intra-prediction mode 2 can be selected for performing intra prediction, and the line 612 can be selected as the line to be used for intra prediction. Because intra-prediction mode 2 was selected, the value of sample 640 can be used as the value of the prediction sample pred'(x',y'). In some cases, as described above, samples from multiple rows or columns can be combined to obtain the value of the prediction sample pred'(x,y).

Samples from any of the lines 602, 604, 606, 608, 610, and/or 612 in the neighborhood of the current block 600 can be used to determine the PDPC reference samples. In one example, continuing with the previous example where intra-prediction mode 2 was used, the reference line 606 and the reference line 608 can be selected as the line to use for determining the PDPC reference samples, denoted as Rx,−2, R−2,y and R−2,−2 due to the reference lines 606 and 608 being two rows/columns away from the current block 600. In some cases, only one line can be used for PDPC, instead of two or more lines. Given the prediction sample pred(x',y') located at (x',y'), the coordinate x of the reference sample Rx,−2 can be given by: x=x'+y'+2, and the coordinate y of the reference sample R−2,y can similarly be given by: y=x'+y'+2. In one illustrative example, the PDPC references samples can be selected as sample 622 for $R_{x,-2}$, sample 642 for $R_{-2,y}$, and sample 644 for $R_{-2,-2}$. The PDPC weights can be determined as:

$$wT=16>>((y'<<1)>>\text{shift}), wL=16>> \\ ((x'<<1)>>\text{shift}), wTL0, \quad \text{(Equation 3)}.$$

The reference samples $R_{x,-2}, R_{-2,y}$ and $R_{-2,-2}$ and the weights wT, wL, and wTL can be used to modify the prediction sample pred'(x',y') using equation 1.

In some examples, the video encoder 22 can signal information indicating the one or more lines that are used for determining one or more PDPC reference samples. In some cases, the signaled information can include an index to a set of pre-determined lines to be used for PDPC. In one illustrative example, an adjacent line (e.g., line 602 and/or line 604 in FIG. 6) to the current block can have an index of 0, a second line from the current block (e.g., line 606 and/or line 608 in FIG. 6) can have an index of 1, and a third line from the current block (e.g., line 610 and/or line 612 in FIG. 6) can have an index of 1. In some examples, the index for the top line (e.g., line 602, 606, or 610) and the corresponding left line (line 604, 608, or 612) is equal. For instance, index 0 can correspond to both the line 602 and the line 604. In some examples, information may be signaled independently for the left and above reference lines, in which case a different index can be used for the top and left lines. For instance, an index of 0 can be used for the line 602 that is the top adjacent line to the current block, an index of 1 can be used for the line 604 that is the left adjacent line to the current block, an index of 2 can be used for the line 606, an index of 3 can be used for the line 608, an index of 4 can be used for the line 610, an index of 5 can be used for the line 612.

The index of the one or more lines that will be used for determining the one or more PDPC reference samples can be sent (e.g., by the video encoder 22) in the video bitstream or with the bitstream (as an out of band communication, such as using a supplemental enhancement information (SEI) message, or other communication). The video decoder 30 can receive the index, and can decode the information in the index to determine which line(s) to use for determining the one or more PDPC reference samples. In some implementations, the index used to indicate which line(s) to use for PDPC can be the same index used to indicate which intra-prediction mode to use. For example, if an index of 1 indicates the second closest line to the current block (e.g., line 606 in FIG. 6) is to be used for intra-prediction, the index of 1 can also indicate that the second closest line to the current block (e.g., line 606 and/or line 608 in FIG. 6) is to be used for determining a PDPC reference sample. In some implementations, the index used to indicate which line(s) to use for PDPC can be different than an index used to indicate which intra-prediction mode to use. For example, one index can be provided to the video decoder 30 to indicate where to find the sample (e.g., which intra-prediction mode to use) that will be used for intra prediction, and another index can be provided to the video decoder 30 to indicate which line(s) to use to determine the one or more PDPC reference samples.

In some examples, the information can include a derived list of one or more lines to be used for PDPC. In some cases, signaling information may be signaled and the reference line to be used for the left and above lines may be derived from the signaling information. For instance, in some cases, the video coder (video encoder 22 and/or video decoder 30) can derive the one or more lines to be used for determining the PDPC reference samples without relying on signaled information. The derivation can be based on block location (e.g., CU, PU, macroblock, CTU, or other block location), the size of a block (e.g., smaller blocks, such as 4×4 blocks, can use less reference lines than larger blocks, such as 8×8 blocks), intra-prediction mode, or other factor.

For instance, whether a current block being predicted is located at or close to a boundary of a CTU (or macroblock or other block) can be used by the video coder (video encoder 22 and/or video decoder 30) to derive which line(s) to use for determining one or more PDPC reference samples for a prediction sample in the block. Depending on where the current block is in the CTU, different set of lines may be available for PDPC. In one illustrative example, when a sample is at a CTU boundary, it may be desired to use one reference line and thus not use more than one reference line. In such cases, if more than one reference line is used (especially the above reference line), there may be additional line buffers that need to be stored, leading to an increase in the buffer memory requirement. The derivation in such an example would be based on the location of the block in the CTU. Blocks further from the edge of the CTU can use multiple reference lines for determining PDPC reference samples. In one illustrative example, for reference samples in blocks that are two blocks away from the edge of a CTU (or macroblock or other block), two reference lines may be used (e.g., reference lines 602 and 606, reference lines 604 and 608, or any other combination of two reference lines from FIG. 6) to determine PDPC reference samples. In another illustrative example, for reference samples in blocks that are at least three blocks away from the edge of a CTU (or macroblock or other block), three reference lines may be used (e.g., reference lines 602, 606, and 610, reference lines 604, 608, and 610, or any other combination of three reference lines from FIG. 6) to determine PDPC reference samples.

As noted above, the coding device can derive the reference line that is to be used to select the one or more PDPC reference samples based on available data, such as intra-prediction mode type. For example, assuming that multiple reference lines are used for regular intra prediction, idx can be used to represent the index to the reference line used for the regular intra prediction. For PDPC, the reference line to be chosen may be based on the intra-prediction mode type. In one example, for Planar mode, the PDPC may choose the reference line closest to the block, irrespective of the value of idx. In another example, for DC mode, the PDPC may choose the reference line closest to the block, irrespective of the value of idx. In another example, for angular modes, the reference line with index equal to idx may be chosen for choosing the reference samples.

In some examples, the coding device (video encoder 22 and/or video decoder 30) can derive the location of the PDPC reference sample from a reference line based on the intra-prediction mode type. For example, for DC mode, the top sample (e.g., from FIG. 2A), the left sample (e.g., $R_{-1,y}$), and the top-left sample (e.g., $R_{-1,-1}$) may be used in some cases. In another example, for a horizontal angular intra-prediction mode (e.g., mode 10), only the top sample (e.g., from FIG. 2A) and the top-left sample (e.g., $R_{-1,-1}$) may be used in some cases. In another example, for a vertical angular intra-prediction mode (e.g., mode 26), only the left sample (e.g., $R_{-1,y}$) and the top-left sample (e.g., $R_{-1,-1}$) may be used in some cases. In another example, for Planar mode, only the top sample (e.g., from FIG. 2A) and the left sample (e.g., $R_{-1,y}$) may be used in some cases.

In some cases, for angular (or directional) intra-prediction modes, the angle of the intra-prediction mode type may be used to derive the reference sample location on the reference line. For instance, a sample from a reference line to be used as a PDPC reference sample can be determined by the angle (or direction) of the particular intra-prediction mode that was used to determine the prediction sample (e.g., pred'(x', y') from FIG. 6). The reference sample position that intersects with the respective reference line and the direction can be selected as the PDPC reference sample. In one illustrative example referring to FIG. 6, the top right group of reference samples 618 and the bottom left group of reference samples 614 can be obtained by deriving where the particular angle of derivation intersects the reference line to derive the reference sample position(s). In some examples, a PDPC reference sample can be co-located with an intra-predicted prediction sample. For instance, if the intra-prediction mode is set to mode 2 (referencing the group of reference samples 614), the sample 642 can be used as the prediction sample (e.g., pred'(x',y') from FIG. 6), and can also be used as one of the PDPC reference samples (e.g., $R_{2,y}$). Because intra-prediction mode 2 was used, the reference sample 622 can be selected as another PDPC reference sample (e.g., $R_{x,-2}$). In some cases, the distance of the reference line from one of the edges of the current block can also be used in addition to or as an alternative to the angle of intra-prediction mode type.

In some cases, the PDPC reference sample derived or determined according to the above-described techniques may not be in an integer sample position that corresponds to an actual sample location (in which case is in a fractional position). In such cases, the coding device (video encoder 22 and/or video decoder 30) may have to interpolate to obtain the PDPC reference sample value. For example, a PDPC reference sample in the reference line can be derived by interpolating the sample from the neighborhood of the sample. In some cases, one or more samples in the reference line are obtained by interpolating other samples in the same reference line. For example, if a determined PDPC sample location in a reference line is between two samples at integer positions in the reference line, the two samples can be used to interpolate the value of the determined PDPC sample location. The interpolation can be performed by linear interpolation (e.g., using two or more samples), using an n-tap interpolation filter (e.g., a 4-tap Gaussian or cubic interpolation filter, or other interpolation filter), or using any other suitable interpolation technique. In one illustrative example, if a derived PDPC sample position is determined (e.g., based on a direction corresponding to the inter-prediction mode, or based on another technique described herein) to be located half way between a first integer sample position and a second integer sample position in a line, linear interpolation can be performed with equal weights (e.g., a weight of 0.5) applied to each of a first sample (S1) located at the first integer sample position and a second sample (S2) located at the second integer sample position. In such an example, the weighted combination of the first sample and the first sample will be used to determine the value of the PDPC sample $S_{PDPC}$. Such a formulation can be denoted as $S_{PDPC}=0.5 \times S1+0.5 \times S2$.

In some examples, the coding device (video encoder 22 and/or video decoder 30) can use a weighted average or nonlinear combination of samples belonging to two or more reference lines in the neighborhood of the current block to derive the PDPC reference samples that will be used for PDPC. As noted above, the particular PDPC reference samples may be derived based on the intra-prediction mode. For instance, for Planar mode, PDPC reference samples may be selected as the reference sample that is above the prediction sample (the top sample) and as the reference sample that is to the left of the prediction sample (the left sample). As another example, for angular modes, the PDPC reference samples may be selected based on the direction of the intra-prediction mode, as noted above.

In some instances, the weights can be based on the distance of the respective PDPC reference sample (from the two or more reference lines) from the prediction sample (e.g., pred'(x',y') from FIG. 6). In one illustrative example referring to FIG. 6, the sample 620, the sample 622, and the sample 624 may be selected as the PDPC reference samples based on the direction of the intra-prediction mode or based on some other factors described herein. The values of the samples 620, 622, and 624 can be averaged using a weighted average. For instance, the sample 624 can have the highest weight (e.g., a weight value of 0.5) since it is closest to the prediction sample pred'(x',y'). The weights can be gradually decreased as the PDPC reference sample locations get further from the location of the prediction sample pred'(x', y'). For instance, the sample 622 can have the next highest weight (e.g., a weight value of 0.3), and the sample 620 can have the lowest weight (e.g., a weight value of 0.2).

In some implementations, the weights used for the averaging may be signaled in or with the video bitstream. In some cases, the weights may be signaled independently for each line, such as for the left and above reference lines. In some implementations, information that may be used to derive the respective weights is signaled in or with the encoded video bitstream. For instance, the weight for a PDPC sample may be pre-determined based on the distance of the respective PDPC reference sample (from the two or more reference lines) from the prediction sample (e.g., pred'(x',y') from FIG. 6), as noted above. In such cases, the coding device can derive the weight based on the distance of the line relative to the prediction sample.

In some examples, when samples from two or more lines are used, the coding device can derive the location of the PDPC samples to be used for the weighted averaging or linear combination based on the reference line and the intra mode type, similar to the techniques described above. In some cases, the distance of the reference line from one of the edges of the current block and/or the angle of intra-prediction mode type may be used to derive the location of the samples to be averaged. In some examples, when samples from two or more lines are used, the coding device can derive one or samples for the weighted averaging or linear combination by interpolating from the neighborhood of the respective samples/sample locations (e.g., by linear interpolation, using an n-tap interpolation filter such as a 4-tap Gaussian or cubic interpolation filter or other interpolation filter, or using any other suitable interpolation technique).

In another example, the coding device can determine different sets of PDPC weights (e.g., wT, wL, wTL, or other PDPC weight) based on the reference line used, can choose one of the different sets of PDPC weights based on the reference line used, and can apply PDPC based on the selected PDPC weights. In some cases, the different sets of PDPC weights can be signaled by the video encoder 22 in or with the video bitstream. For example, if an adjacent line to the current block (e.g., line 602 and/or line 604 from FIG. 6) is chosen, a first set of PDPC weights may be used, and if a non-adjacent line (e.g., line 606, line 608, line 610, and/or line 610 from FIG. 6) is chosen, a second and/or third set of PDPC weights may be used which are lower than the first set of PDPC weights. One reason for using different PDPC weights depending on the reference line that is used is due to differences in error reduction capabilities at different positions in a block. For instance, when an adjacent line to the current block is used (e.g., line 602 and/or line 604 from FIG. 6), a large amount of prediction error will be reduced on the edges of the current block, leading to a high confidence of correcting the prediction errors. The error can occur due to the high correlation of spatially adjacent samples observed in typical images and videos; as the distance between the samples increases, the correlation typically decreases. In such cases, higher PDPC weights can be used for the adjacent lines, leading to more contribution from the PDPC reference samples from the adjacent lines as compared to PDPC reference samples from non-adjacent lines. As the reference lines get further away from the current block, the prediction error correction is less precise, in which case lower weights may be used. In one illustrative example referring to equation 2 above, if reference line 606 is used (e.g., corresponding to a reference line index of 1), the x and y position may be changed to x+1 and y+1 because the distance of the reference line 606 is one unit away from the current block 600, leading to smaller wT, wL, and wTL weights than those used for adjacent lines.

In some cases, one set of PDPC weights are signaled, and the PDPC weights to be applied are derived from the signaled weights based on the reference line used. In one illustrative example, a weight parameter (e.g., x+a and y+a, where x is the x-coordinate of the prediction sample, y is the y-coordinate of the prediction sample, and a is equal to the reference line index or the position of the line relative to the current block) can be signaled by the video encoder 22, and the video decoder 30 can derive the weights based on that parameter based on the reference line index of the reference line that is to be used or based on the position of the line relative to the current block. Using the example from above, if reference line 606 is used (e.g., corresponding to a reference line index of 1), the video decoder 30 may determine the value of a is equal to 1, and may use x+1 and y+1 in equation 2 above.

In some cases, the derivation of the PDPC weights may be dependent on the intra mode type. In one example, for the DC mode, the weights can be calculated using equation 2 for a block with dimensions width and height. In other examples, for Planar mode wTL=0, for horizontal mode wL=0 and wTL=wT, and for vertical mode wT=0 and wTL=wL. In some cases, the PDPC weights can be calculated with adds and shifts only. In another example, the PDPC weights can be determined using equation 3.

FIG. 7 is a flowchart illustrating an example of a process 700 of decoding video data using one or more of the techniques described herein. At block 702, the process 700 includes predicting an initial prediction sample value for a sample of a current block using an intra-prediction mode. The initial prediction sample value is predicted from at least one of a first neighboring block or a second neighboring block of the current block.

In some cases, the first and second neighboring blocks can be separate blocks and can be on different sides of the current block. In one illustrative example, the first neighboring block can be a top neighboring block (above the current block) and the second neighboring block can be a left neighboring block (to the left of the current block). In some cases, the first and second neighboring blocks can be separate blocks and can both be neighboring on a same side of the current block. In such cases, the current block can include a block of a certain size (e.g., a 64×64 block), and the first and second neighboring blocks can have smaller sizes than the current block (e.g., a size of 4×4, 16×16, or other size), allowing both the first and second neighboring blocks to neighbor the current block on a same side of the current block. In one illustrative example, the first neighboring block can be a first top neighboring block (above the current block) and the second neighboring block can be a second top neighboring block (also above the current block). In another illustrative example, the first neighboring block can be a first left neighboring block (to the left of the current block) and the second neighboring block can be a second left neighboring block (also to the left of the current block).

At block 704, the process 700 includes determining one or more reference sample values from at least one line of multiple lines of reference samples. The multiple lines of reference samples are from the first neighboring block and/or the second neighboring block of the current block. In some cases, determining the one or more reference sample values includes determining a weighted average of samples from two or more lines of the multiple lines of reference samples.

In some cases, the at least one line of the multiple lines of reference samples used for determining the one or more reference sample values is not adjacent to the current block. In some cases, the at least one line of the multiple lines of reference samples used for determining the one or more reference sample values is adjacent to the current block. In one illustrative example, the at least one line of the multiple lines of reference samples includes a line of reference samples above the current block and/or a line of reference samples on a left side of the current block. In some examples, the line of reference samples above the current block includes a line other than a nearest line above the current block. In some examples, the line of reference samples on the left side of the current block includes a line other than a nearest line on the left side of the current block. In some examples, both the line of reference samples above the current block includes a line other than a nearest line above the current block, and the line of reference samples on the left side of the current block includes a line other than a nearest line on the left side of the current block.

The initial prediction sample value can be predicted from one or more lines of the multiple lines of reference samples. One or more lines used for predicting the initial prediction sample value can be the same or different than the one or more lines used for determining the one or more reference sample values. For example, a first line of reference samples used for determining the one or more reference sample values can be different than a second line of reference samples used for predicting the initial prediction sample value. In some cases, the first line of reference samples used for determining the one or more reference sample values can include a nearest line above the current block (e.g., line 602 from FIG. 6) or a nearest line on a left side of the current block (e.g., line 604 from FIG. 6), and the second line of reference samples used for predicting the initial prediction sample value can include a line other than a nearest line above the current block (e.g., one of lines 606 or 610 from FIG. 6) or a line other than a nearest line on the left side of the current block (e.g., one of lines 608 or 612 from FIG. 6). In some cases, the first line of reference samples used for determining the one or more reference sample values can include a line other than a nearest line above the current block (e.g., one of lines 606 or 610 from FIG. 6) or a line other than a nearest line on the left side of the current block (e.g., one of lines 608 or 612 from FIG. 6), and the second line of reference samples used for predicting the initial prediction sample value can include a nearest line above the current block (e.g., line 602 from FIG. 6) or a nearest line on a left side of the current block (e.g., line 604 from FIG. 6).

At block 706, the process 700 includes determining a final prediction sample value for the sample of the current block. Determining the final prediction sample value includes modifying the initial prediction sample value using the one or more reference sample values. For example, modifying the initial prediction sample value using the one or more reference sample values can include determining a weighted combination of the initial prediction sample value and the one or more reference sample values. In some cases, the process 700 includes determining a plurality of weights based on an x-coordinate and a y-coordinate of a sample associated with the initial prediction sample value. In such cases, the weighted combination is based on the one or more reference sample values, the plurality of weights, and the initial prediction sample value (e.g., using equation 1 from above).

At block 708, the process 700 includes reconstructing the sample of the current block based on the final prediction sample value.

In some examples, the process 700 includes determining, for the current block, a prediction block including a plurality of prediction samples based on the intra-prediction mode. The initial prediction sample value is predicted from the plurality of prediction samples from the prediction block.

In some examples, the process 700 includes obtaining an encoded video bitstream including signaling information. The signaling information indicates the at least one line of the multiple lines of reference samples to use for determining the one or more reference sample values. In such examples, the process 700 further includes processing the signaling information to determine the one or more lines of reference samples to use for determining the one or more reference sample values.

In some examples, the signaling information includes an index to a set of pre-determined lines. The set of pre-determined lines correspond to the one or more lines of reference samples to use for determining the one or more reference sample values. In some examples, the signaling information includes an index to a derived list of one or more lines. The derived list of one or more lines corresponds to the one or more lines of reference samples to use for determining the one or more reference sample values. In some examples, the signaling information is signaled in the encoded video bitstream independently for a line above the current block and for a line on a left side of the current block. In some examples, the signaling information includes a set of weights for use in determining the final prediction sample value. The set of weights can be selected from multiple sets of weights based on the at least one line of the multiple lines of reference samples used for determining the one or more reference sample values.

In some examples, the process 700 includes deriving, based on a type of the intra-prediction mode, a location of a reference sample from the at least one line of the multiple lines of reference samples. The reference sample is associated with a reference sample value of the one or more reference sample values. In some examples, the location is derived based on a distance of the reference line from an edge of the current block and an angle associated with the type of the intra-prediction mode.

In some examples, the process 700 includes deriving a reference sample value of the one or more reference sample values from the at least one line of the multiple lines of reference samples. In such examples, the reference sample value can be derived by interpolating the reference sample value from a neighborhood of reference sample values around the reference sample value.

In some examples, the process 700 includes deriving, based on a type of the intra-prediction mode, the at least one line of the multiple lines of reference samples to use for determining the one or more reference sample values.

FIG. 8 is a flowchart illustrating an example of a process 800 of encoding video data using one or more of the techniques described herein. At block 802, the process 800 includes predicting an initial prediction sample value for a sample of a current block using an intra-prediction mode. The initial prediction sample value is predicted from at least one of a first neighboring block or a second neighboring block of the current block.

In some cases, the first and second neighboring blocks can be separate blocks and can be on different sides of the current block. In one illustrative example, the first neighboring block can be a top neighboring block (above the current block) and the second neighboring block can be a left neighboring block (to the left of the current block). In some cases, the first and second neighboring blocks can be separate blocks and can both be neighboring on a same side of the current block. In one illustrative example, the first neighboring block can be a first top neighboring block (above the current block) and the second neighboring block can be a second top neighboring block (also above the current block). In another illustrative example, the first neighboring block can be a first left neighboring block (to the left of the current block) and the second neighboring block can be a second left neighboring block (also to the left of the current block).

At block 804, the process 800 includes determining one or more reference sample values from at least one line of multiple lines of reference samples. The multiple lines of reference samples are from the first neighboring block and/or the second neighboring block of the current block. In some cases, determining the one or more reference sample values includes determining a weighted average of samples from two or more lines of the multiple lines of reference samples.

In some cases, the at least one line of the multiple lines of reference samples used for determining the one or more reference sample values is not adjacent to the current block. In some cases, the at least one line of the multiple lines of reference samples used for determining the one or more reference sample values is adjacent to the current block. In one illustrative example, the at least one line of the multiple lines of reference samples includes a line of reference samples above the current block and/or a line of reference samples on a left side of the current block. In some examples, the line of reference samples above the current block includes a line other than a nearest line above the current block. In some examples, the line of reference samples on the left side of the current block includes a line other than a nearest line on the left side of the current block. In some examples, both the line of reference samples above the current block includes a line other than a nearest line above the current block, and the line of reference samples on the left side of the current block includes a line other than a nearest line on the left side of the current block.

The initial prediction sample value can be predicted from one or more lines of the multiple lines of reference samples. One or more lines used for predicting the initial prediction sample value can be the same or different than the one or more lines used for determining the one or more reference sample values. For example, a first line of reference samples used for determining the one or more reference sample values can be different than a second line of reference samples used for predicting the initial prediction sample value. In some cases, the first line of reference samples used for determining the one or more reference sample values can include a nearest line above the current block (e.g., line 602 from FIG. 6) or a nearest line on a left side of the current block (e.g., line 604 from FIG. 6), and the second line of reference samples used for predicting the initial prediction sample value can include a line other than a nearest line above the current block (e.g., one of lines 606 or 610 from FIG. 6) or a line other than a nearest line on the left side of the current block (e.g., one of lines 608 or 612 from FIG. 6). In some cases, the first line of reference samples used for determining the one or more reference sample values can include a line other than a nearest line above the current block (e.g., one of lines 606 or 610 from FIG. 6) or a line other than a nearest line on the left side of the current block (e.g., one of lines 608 or 612 from FIG. 6), and the second line of reference samples used for predicting the initial prediction sample value can include a nearest line above the current block (e.g., line 602 from FIG. 6) or a nearest line on a left side of the current block (e.g., line 604 from FIG. 6).

At block 806, the process 800 includes determining a final prediction sample value for the sample of the current block. Determining the final prediction sample value includes modifying the initial prediction sample value using the one or more reference sample values. For example, modifying the initial prediction sample value using the one or more reference sample values can include determining a weighted combination of the initial prediction sample value and the one or more reference sample values. In some cases, the process 700 includes determining a plurality of weights based on an x-coordinate and a y-coordinate of a sample associated with the initial prediction sample value. In such cases, the weighted combination is based on the one or more reference sample values, the plurality of weights, and the initial prediction sample value (e.g., using equation 1 from above).

At block 808, the process 800 includes determining a residual value for a residual block based on the final prediction sample value and a value of the sample of the current block. At block 810, the process 800 includes signaling information indicative of the residual value.

In some examples, the process 800 includes determining, for the current block, a prediction block including a plurality of prediction samples based on the intra-prediction mode. The initial prediction sample value is predicted from the plurality of prediction samples from the prediction block.

In some examples, the process 800 includes generating an encoded video bitstream including signaling information. The signaling information indicates the at least one line of the multiple lines of reference samples to use for determining the one or more reference sample values. In some examples, the signaling information includes an index to a set of pre-determined lines. The set of pre-determined lines correspond to the one or more lines of reference samples to use for determining the one or more reference sample values. In some examples, the signaling information includes an index to a derived list of one or more lines. The derived list of one or more lines corresponds to the one or more lines of reference samples to use for determining the one or more reference sample values. In some examples, the signaling information is signaled in the encoded video bitstream independently for a line above the current block and for a line on a left side of the current block. In some examples, the signaling information includes a set of weights for use in determining the final prediction sample value. The set of weights can be selected from multiple sets of weights based on the at least one line of the multiple lines of reference samples used for determining the one or more reference sample values.

In some examples, the process 800 includes deriving, based on a type of the intra-prediction mode, a location of a reference sample from the at least one line of the multiple lines of reference samples. The reference sample is associated with a reference sample value of the one or more reference sample values. In some examples, the location is derived based on a distance of the reference line from an edge of the current block and an angle associated with the type of the intra-prediction mode.

In some examples, the process 800 includes deriving a reference sample value of the one or more reference sample values from the at least one line of the multiple lines of reference samples. In such examples, the reference sample value can be derived by interpolating the reference sample value from a neighborhood of reference sample values around the reference sample value.

In some examples, the process 800 includes deriving, based on a type of the intra-prediction mode, the at least one line of the multiple lines of reference samples to use for determining the one or more reference sample values.

In some examples, the processes 700 and 800 may be performed by a computing device or an apparatus. For example, the process 700 can be performed by the video decoder 30, or by a device or apparatus including the video decoder 30. In another example, the process 800 can be performed by the video encoder 22, or by a device or apparatus including the video encoder 22. In some cases, the computing device or apparatus may include a processor, microprocessor, microcomputer, or other component of a device that is configured to carry out the steps of one or both of the processes 700 and 800. In some examples, the computing device or apparatus may include one or more components, such as one or more cameras for capturing one or more images, an input device (e.g., a touchscreen interface, a keypad, a mouse, or other input device), an output device (e.g., a display for displaying one or more images, notifications, or other displayable data, a speaker for outputting audio, or other output device), any combination thereof, or other suitable component. For example, the computing device may include a desktop computers, a notebook (i.e., laptop) computer, a tablet computer, a set-top box, a telephone handset such as a so-called "smart" phone, a television, a camera, a display device, a digital media player, a video gaming console, a video streaming device, a wearable device, or the like, or other device with the one or more components. In some cases, the computing device may include a video codec. In some examples, some of the one or more components can be separate from the computing device, in which case the computing device receives the data or transmits the data. The computing device may further include a network interface configured to communicate data. The network interface may be configured to communicate Internet Protocol (IP) based data or other suitable network data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 700 and 800 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700 and 800 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
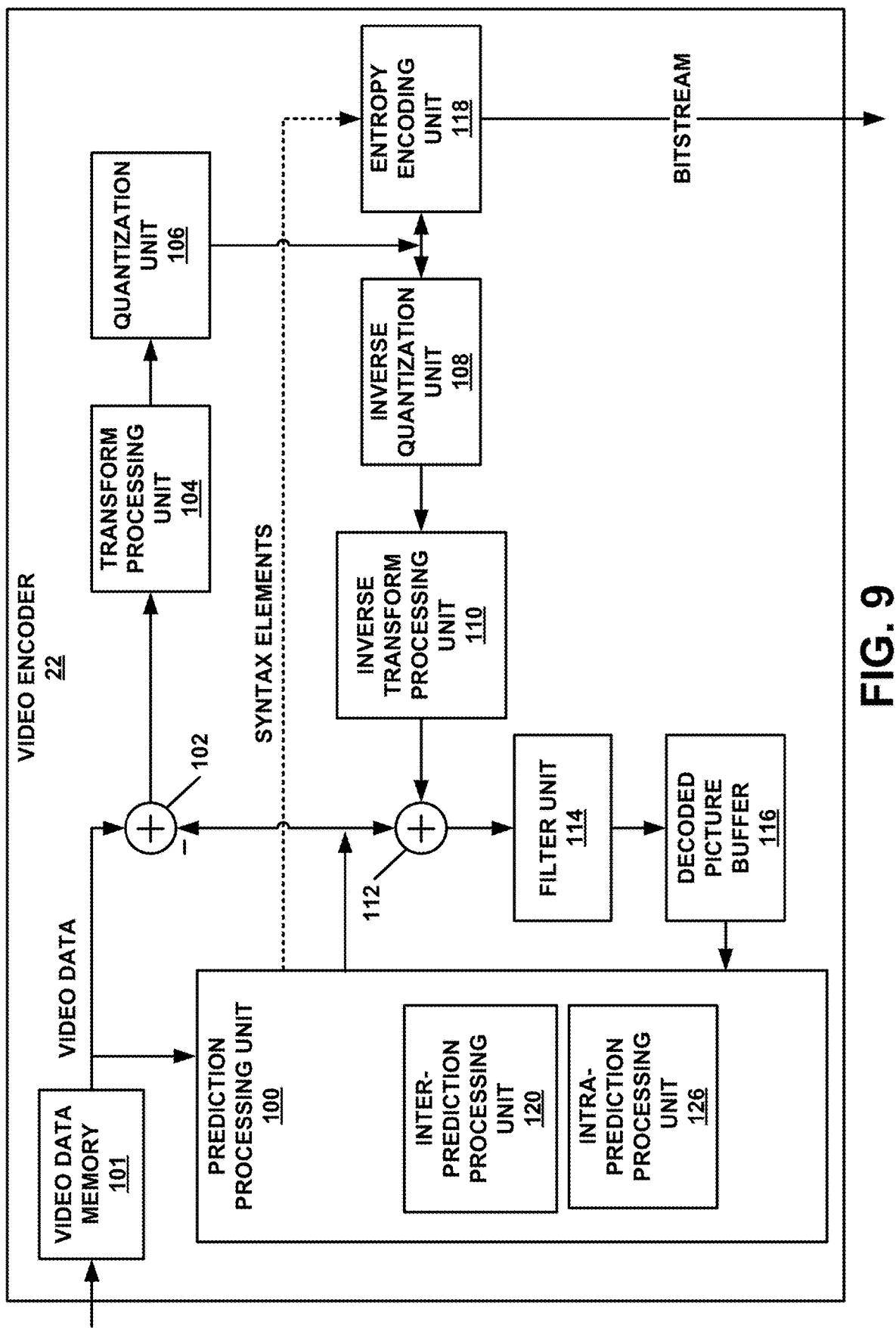
FIG. 9 is a block diagram illustrating an example of a video encoder, in accordance with some examples.
Figure 10:
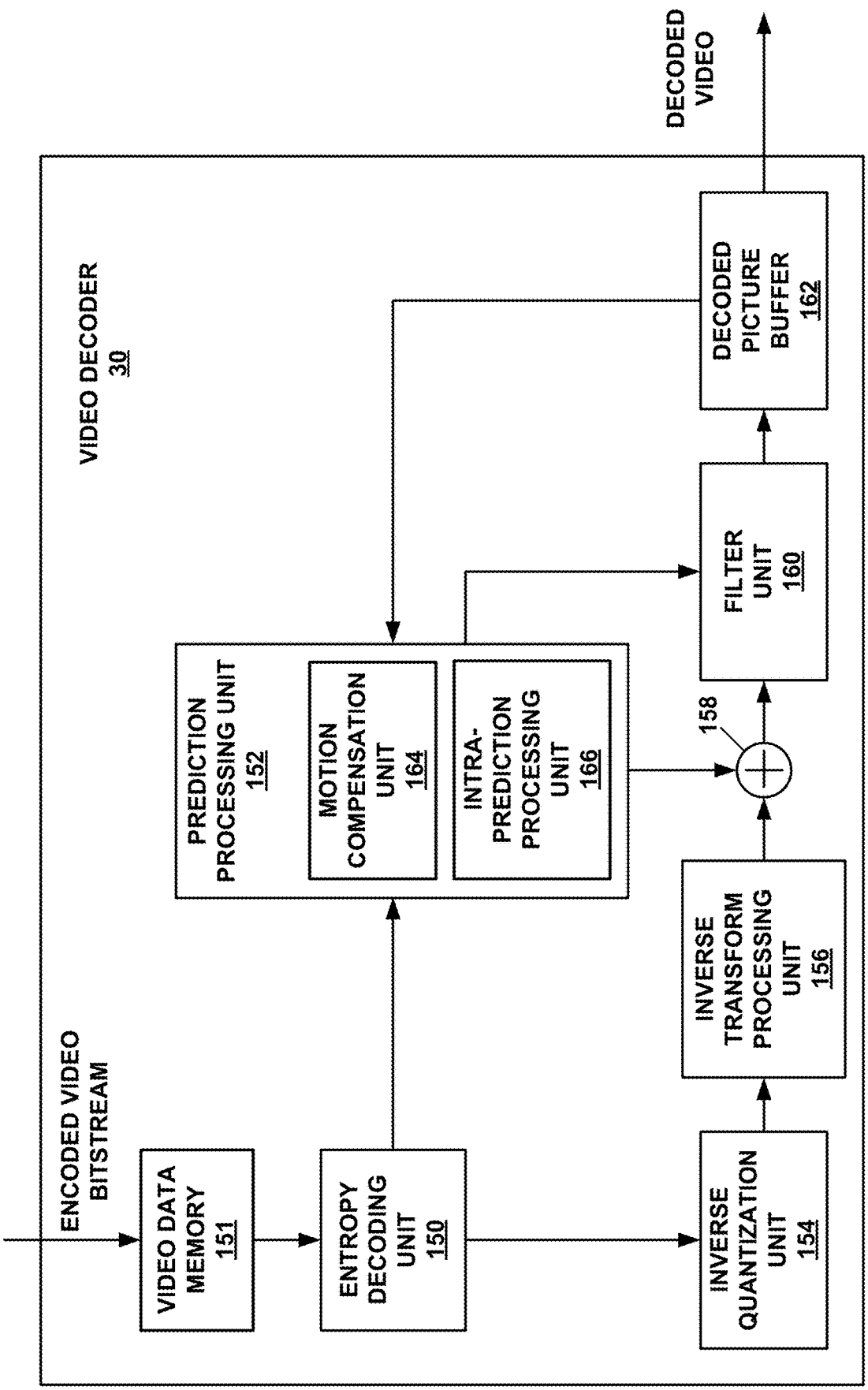
FIG. 10 is a block diagram illustrating an example of a video decoder, in accordance with some examples.

FIG. 9 is a block diagram illustrating an example video encoder 22 that may implement the techniques of this disclosure. FIG. 9 is provided for purposes of explanation and should not be considered limiting of the techniques as broadly exemplified and described in this disclosure. The techniques of this disclosure may be applicable to various coding standards or methods.

In the example of FIG. 9, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma CTBs and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns. In one example, prediction processing unit 100 or another processing unit of video encoder 22 may be configured to perform any combination of the techniques described herein.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. In accordance with techniques of this disclosure, a CU may only include a single PU. That is, in some examples of this disclosure, a CU is not divided into separate prediction blocks, but rather, a prediction process is performed on the entire CU. Thus, each CU may be associated with a luma prediction block and corresponding chroma prediction blocks. Video encoder 22 and video decoder 30 may support CUs having various sizes. As indicated above, the size of a CU may refer to the size of the luma coding block of the CU also the size of a luma prediction block. As discussed above, video encoder 22 and video decoder 30 may support CU sizes defined by any combination of the example partitioning techniques described herein.

Inter-prediction processing unit 120 may generate predictive data for a PU by performing inter prediction on each PU of a CU. As explained herein, in some examples of this disclosure, a CU may contain only a single PU, that is, the CU and PU may be synonymous. The predictive data for the PU may include predictive blocks of the PU and motion information for the PU. Inter-prediction processing unit 120 may perform different operations for a PU or a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

In one example, Intra-prediction processing unit 126 may be configured to implement techniques of the disclosure. In other examples, other units or modules may be configured to implement all or some of the techniques of the disclosure.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In other examples, transform processing unit 104 may be configured to partition TUs in accordance with the partitioning techniques described herein. For example, video encoder 22 may not further divide CUs into TUs using an RQT structure. As such, in one example, a CU includes a single TU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents the partition structure for a CU according to the techniques of this disclosure.

FIG. 9 is a block diagram illustrating an example video decoder 30 that is configured to implement the techniques of this disclosure. FIG. 9 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 9, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150, or another processing unit of video decoder 30, may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed partition types for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU. As discussed above, in one example of the disclosure, a CU includes a single TU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a CU or PU is encoded using intra prediction, intra-prediction processing unit 166 may perform intra prediction to generate predictive blocks of the PU. Intra-prediction processing unit 166 may use an intra prediction mode to generate the predictive blocks of the PU based on samples spatially-neighboring blocks. Intra-prediction processing unit 166 may determine the intra prediction mode for the PU based on one or more syntax elements obtained from the bitstream.

In one example, Intra-prediction processing unit 166 may be configured to implement techniques of the disclosure. In other examples, other units or modules may be configured to implement all or some of the techniques of the disclosure.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU. As discussed above, a CU may include only a single PU. That is, a CU may not be divided into multiple PUs.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

The video decoder outputs a decoded version of the current picture that includes a decoded version of the current block. When the video decoder is a video decoder configured to output displayable decoded video, then the video decoder may, for example, output the decoded version of the current picture to a display device. When the decoding is performed as part of a decoding loop of a video encoding process, then the video decoder may store the decoded version of the current picture as a reference picture for use in encoding another picture of the video data.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:
predicting an initial prediction sample value for a sample of a current block using an intra-prediction mode, wherein the initial prediction sample value is predicted from one or more lines of multiple lines of samples from at least one of a first neighboring block or a second neighboring block of the current block, the initial prediction sample value being included in a prediction block generated for the current block, wherein an indication of the one or more lines to use for predicting the initial prediction sample value is signaled in an encoded video bitstream;
determining, using Position Dependent Intra Prediction Combination (PDPC), one or more reference sample values from at least one line of the multiple lines of samples, wherein PDPC is performed for the current block only when a line of samples from at least one of the first neighboring block or the second neighboring block of the current block that is nearest to the current block is used for the intra-prediction mode;
determining a final prediction sample value for the sample of the current block, wherein determining the final prediction sample value includes modifying the initial prediction sample value from the prediction block using the one or more reference sample values; and
reconstructing the sample of the current block based on the final prediction sample value.

2. The method of claim 1, wherein the at least one line of the multiple lines of samples used for determining the one or more reference sample values is adjacent to the current block.

3. The method of claim 1, wherein the at least one line of the multiple lines of samples includes at least one of a line of reference samples above the current block or a line of reference samples on a left side of the current block.

4. The method of claim 1, wherein a first line of reference samples used for determining the one or more reference sample values is different than a second line of reference samples used for predicting the initial prediction sample value.

5. The method of claim 1, further comprising:
determining, for the current block, the prediction block including a plurality of prediction samples based on the intra-prediction mode.

6. The method of claim 1, wherein modifying the initial prediction sample value using the one or more reference sample values includes:
determining a weighted combination of the initial prediction sample value and the one or more reference sample values.

7. The method of claim 6, further comprising:
determining a plurality of weights based on an x-coordinate and a y-coordinate of a sample associated with the initial prediction sample value, wherein the weighted combination is based on the one or more reference sample values, the plurality of weights, and the initial prediction sample value.

8. The method of claim 1, further comprising:
obtaining the encoded video bitstream including signaling information, the signaling information including the indication of the one or more lines to use for predicting the initial prediction sample value; and
processing the indication to determine the one or more lines to use for predicting the initial prediction sample value.

9. The method of claim 8, wherein the signaling information is signaled in the encoded video bitstream independently for a line above the current block and for a line on a left side of the current block.

10. The method of claim 8, wherein the signaling information includes a set of weights for use in determining the final prediction sample value, wherein the set of weights is selected from multiple sets of weights based on the at least one line of the multiple lines of samples used for determining the one or more reference sample values.

11. The method of claim 1, wherein the indication includes an index to a set of pre-determined lines, the set of pre-determined lines corresponding to the one or more lines of samples to use for predicting the initial prediction sample value.

12. The method of claim 1, wherein the indication includes an index to a derived list of one or more lines, the derived list of one or more lines corresponding to the one or more lines of samples to use for predicting the initial prediction sample value.

13. The method of claim 1, further comprising:
determining, based on a type of the intra-prediction mode, a location of a reference sample from the at least one line of the multiple lines of samples to use for determining the one or more reference sample values.

14. The method of claim 13, wherein the location of the reference sample from the at least one line is derived based on a distance of a reference line from an edge of the current block and an angle associated with the type of the intra-prediction mode.

15. The method of claim 1, further comprising:
deriving a reference sample value of the one or more reference sample values from the at least one line of the multiple lines of samples, wherein the reference sample value is derived by interpolating the reference sample value from a neighborhood of reference sample values around the reference sample value.

16. The method of claim 1, further comprising:
determining, based on a type of the intra-prediction mode, the at least one line of the multiple lines of samples to use for determining the one or more reference sample values.

17. The method of claim 1, wherein determining the one or more reference sample values includes determining a weighted average of samples from two or more lines of the multiple lines of samples.

18. The method of claim 1, wherein the one or more lines of the multiple lines of samples used for predicting the initial prediction sample value is an adjacent line that is nearest to the current block.

19. The method of claim 18, wherein the adjacent line is associated with an index value of 0, and wherein PDPC is performed for the current block based determining the index value of 0.

20. A method of encoding video data, the method comprising:
predicting an initial prediction sample value for a sample of a current block using an intra-prediction mode, wherein the initial prediction sample value is predicted from one or more lines of multiple lines of samples from at least one of a first neighboring block or a second neighboring block of the current block, the initial prediction sample value being included in a prediction block generated for the current block;
determining, using Position Dependent Intra Prediction Combination (PDPC), one or more reference sample values from at least one line of the multiple lines of samples, wherein PDPC is performed for the current block only when a line of samples from at least one of the first neighboring block or the second neighboring block of the current block that is nearest to the current block is used for the intra-prediction mode;

determining a final prediction sample value for the sample of the current block, wherein determining the final prediction sample value includes modifying the initial prediction sample value from the prediction block using the one or more reference sample values;

determining a residual value for a residual block based on the final prediction sample value and a value of the sample of the current block; and generating an encoded video bitstream, the encoded video bitstream including information indicative of the residual value and an indication of the one or more lines to use for predicting the initial prediction sample value.

21. An apparatus for decoding video data, the apparatus comprising:

a memory configured to store at least one of a first neighboring block or a second neighboring block of a current block; and a video decoder comprising at least one of fixed-function or programmable circuitry, wherein the video decoder is configured to:

predict an initial prediction sample value for a sample of a current block using an intra-prediction mode, wherein the initial prediction sample value is predicted from one or more lines of multiple lines of samples from at least one of a first neighboring block or a second neighboring block of the current block, the initial prediction sample value being included in a prediction block generated for the current block, wherein an indication of the one or more lines to use for predicting the initial prediction sample value is signaled in an encoded video bitstream;

determine, using Position Dependent Intra Prediction Combination (PDPC), one or more reference sample values from at least one line of the multiple lines of samples, wherein PDPC is performed for the current block only when a line of samples from at least one of the first neighboring block or the second neighboring block of the current block that is nearest to the current block is used for the intra-prediction mode;

determine a final prediction sample value for the sample of the current block, wherein determining the final prediction sample value includes modifying the initial prediction sample value from the prediction block using the one or more reference sample values; and reconstruct the sample of the current block based on the final prediction sample value.

22. The apparatus of claim 21, wherein the at least one line of the multiple lines of samples used for determining the one or more reference sample values is adjacent to the current block.

23. The apparatus of claim 21, wherein the at least one line of the multiple lines of samples includes at least one of a line of reference samples above the current block or a line of reference samples on a left side of the current block.

24. The apparatus of claim 21, wherein a first line of reference samples used for determining the one or more reference sample values is different than a second line of reference samples used for predicting the initial prediction sample value.

25. The apparatus of claim 21, wherein, to modify the initial prediction sample value using the one or more reference sample values, the video decoder is configured to:

determine a weighted combination of the initial prediction sample value and the one or more reference sample values.

26. The apparatus of claim 21, further comprising a display configured to display the current block.

27. The apparatus of claim 21, wherein the apparatus comprises one or more of a camera, a computer, a mobile device, a broadcast receiver device, or a set-top box.

28. The apparatus of claim 21, wherein the one or more lines of the multiple lines of samples used for predicting the initial prediction sample value is an adjacent line that is nearest to the current block.

29. The apparatus of claim 28, wherein the adjacent line is associated with an index value of 0, and wherein PDPC is performed for the current block based determining the index value of 0.

30. An apparatus for encoding video data, the apparatus comprising:

a memory configured to store at least one of a first neighboring block or a second neighboring block of a current block; and a video encoder comprising at least one of fixed-function or programmable circuitry, wherein the video encoder is configured to:

predict an initial prediction sample value for a sample of a current block using an intra-prediction mode, wherein the initial prediction sample value is predicted from one or more lines of multiple lines of samples from at least one of a first neighboring block or a second neighboring block of the current block, the initial prediction sample value being included in a prediction block generated for the current block;

determine, using Position Dependent Intra Prediction Combination (PDPC), one or more reference sample values from at least one line of the multiple lines of samples, wherein PDPC is performed for the current block only when a line of samples from at least one of the first neighboring block or the second neighboring block of the current block that is nearest to the current block is used for the intra-prediction mode;

determine a final prediction sample value for the sample of the current block, wherein determining the final prediction sample value includes modifying the initial prediction sample value from the prediction block using the one or more reference sample values;

determine a residual value for a residual block based on the final prediction sample value and a value of the sample of the current block; and generate an encoded video bitstream, the encoded video bitstream including signaling information indicative of the residual value and an indication of the one or more lines to use for predicting the initial prediction sample value.

* * * * *